(12) United States Patent
Inoue

(10) Patent No.: US 8,250,349 B2
(45) Date of Patent: Aug. 21, 2012

(54) BRANCH PREDICTION CONTROL DEVICE HAVING RETURN ADDRESS STACK AND METHOD OF BRANCH PREDICTION

(75) Inventor: Tomoo Inoue, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 481 days.

(21) Appl. No.: 12/155,361

(22) Filed: Jun. 3, 2008

(65) Prior Publication Data

US 2008/0301420 A1 Dec. 4, 2008

(30) Foreign Application Priority Data

Jun. 4, 2007 (JP) ................................ 2007-148161

(51) Int. Cl.
*G06F 9/00* (2006.01)
(52) U.S. Cl. ...................................... 712/242
(58) Field of Classification Search ........................ None
See application file for complete search history.

(56) References Cited

U.S. PATENT DOCUMENTS

| | | | | |
|---|---|---|---|---|
| 5,822,576 A | * | 10/1998 | Dinkjian et al. | 712/239 |
| 5,964,868 A | * | 10/1999 | Gochman et al. | 712/234 |
| 6,253,315 B1 | * | 6/2001 | Yeh | 712/238 |
| 6,374,350 B1 | * | 4/2002 | D'Sa et al. | 712/239 |
| 6,530,016 B1 | | 3/2003 | Ukai et al. | |
| 6,877,085 B2 | * | 4/2005 | Yeh et al. | 712/216 |
| 6,898,699 B2 | * | 5/2005 | Jourdan et al. | 712/243 |
| 7,757,071 B2 | | 7/2010 | Yokoi et al. | |
| 2005/0132175 A1 | * | 6/2005 | Henry et al. | 712/239 |
| 2006/0026410 A1 | | 2/2006 | Yokoi et al. | |

FOREIGN PATENT DOCUMENTS

| | | | |
|---|---|---|---|
| EP | 1513062 A1 | * | 3/2005 |
| JP | 2000-172507 | | 6/2000 |
| JP | 2006-40173 | | 2/2006 |

* cited by examiner

*Primary Examiner* — Jacob A Petranek
(74) *Attorney, Agent, or Firm* — McGinn IP Law Group, PLLC

(57) ABSTRACT

A branch prediction control device, in an information processing unit which performs a pipeline process, generates a branch prediction address used for verification of an instruction being speculatively executed. The branch prediction control device includes a first return address storage unit storing the prediction return address, a second return address storage unit storing a return address to be generated depending on an execution result of the call instruction, and a branch prediction address storage unit sending a stored prediction return address as a branch prediction address and storing the sent branch prediction address. When the branch prediction address differs from a return address, which is generated after executing a branch instruction or a return instruction, contents stored in the second return address storage unit are copied to the first return address storage unit.

12 Claims, 10 Drawing Sheets

BRANCH PREDICTION CONTROL DEVICE HAVING RETURN ADDRESS STACK AND METHOD OF BRANCH PREDICTION

BACKGROUND OF THE INVENTION

1. Field of the Invention

The present invention relates to a control device and a method, which are related to a branch prediction of a microprocessor.

2. Description of Related Art

A microprocessor which performs a pipeline process simultaneously executes a number of instructions like an assembly line operation. However, when a branch instruction occurs during the execution of instructions, the pipeline stalls because the processor does not know whether to take the instruction or not until the branch instruction is completed.

If the processor waits for the completion of the process of the branch instruction, then the process misses the chances of reading and issuing a number of instructions. A branch prediction predicts whether to perform a branch operation according to a branch instruction, fetches the next instruction, and then loads the instruction into the pipeline. If the prediction is correct, then the instruction can be continued without stalling the pipeline. If the prediction is incorrect, an instruction fetch is performed using an address in a correct branch direction to resume the execution process. A failure of this branch prediction is referred to as a branch prediction miss. When a branch prediction miss occurs, the pipeline stalls. Then, an instruction in a correct branch direction is fetched and loaded into the pipeline to be executed. The period of time until the instruction is executed is referred to as a branch prediction miss penalty. The microprocessor with many pipeline stages where instructions are fetched and executed increases the branch prediction miss penalty when the branch prediction is incorrect. Consequently, severe performance degradation is caused. For that reason, prediction accuracy is critically important in the branch prediction.

Further, there are microprocessors which perform a speculative execution, to increase the effect of the branch prediction. Here, the speculative execution means that an instruction of a branch prediction target is executed in advance according to the branch prediction. In other words, this is a function by which the instruction subsequent to the branch prediction is executed before it is found if the branch prediction is correct or incorrect.

A technique related to a conventional branch prediction is disclosed in Patent Document 1. Patent Document 1 discloses an instruction fetch control device which performs, at a high speed, a sequence of instructions such as a subroutine call/return instruction in a microprocessor. FIG. 10 is a block diagram illustrating the instruction fetch control device according to Patent Document 1. The device disclosed in Patent Document 1 has a structure including a return address stack 301 and a branch history 302 for the branch prediction of a return instruction.

The return address stack (hereinafter, referred to as an RAS) 301 is a register which stacks a return address of a subroutine. The RAS 301 performs a push process on a return address at the time of completion of a call instruction. That is, an execution position is moved to a designated address by the call instruction, and thereafter, a return address or the address information of the next instruction is stored in the RAS 301 in order to operate a stack pointer. Further, the RAS 301 performs a pop process on the return address at the time of the completion of the return instruction. That is, the execution position is moved to the return address taken out from the RAS 301 by the return instruction, or to an address of the next instruction, in order to operate the stack pointer.

The branch history 302 is a table in which the history information of past branch predictions is stored. A stack pointer value is changed by the push process or the pop process of the RAS 301. A branch prediction address is read from one of the RAS 301 and the branch history 302 according to the value.

In an instruction fetch control unit 300 shown in FIG. 10, once an instruction is fetched, instruction codes are read from an instruction cache 305 and the branch history 302 according to an address outputted from an instruction address generator 304. When a selection controller 306 recognizes an instruction code as a return instruction, the selection controller 306 refers to a stack pointer. The selection controller 306 then outputs a selection signal for selecting from which the RAS 301 or the branch history 302 a prediction branch target address is to be read. Thereafter, the following instruction fetch is performed using the selected prediction branch target address. As to the stack pointer, when a completed instruction is a call instruction, a push process is performed on the stack pointer, and when the completed instruction is a return instruction, a pop process is performed on the stack pointer. As described above, the branch prediction of the return instruction is performed by including the RAS 301 and the branch history 302 in Patent Document 1. Note that, when a branch prediction miss occurs and a reinstruction fetch occurs, the stack pointer is retuned to a minimum value, and the process is restarted from the beginning.

However, in Patent Document 1, the pointer control of the RAS 301 is performed at the completion of the subroutine call/return instruction. Thus, in the case where the execution of the subsequent instruction fetch and the return instruction in the prediction branch target address are close in time, the branch prediction miss occurs frequently when only the RAS 301 performs the branch prediction. For example, when a return instruction is issued before the completion of a call instruction due to the advance reading of a prediction branch target address of the call instruction, or the like (at the time of the speculative fetching of an instruction), the branch prediction miss occur frequently because the return address is not stored in the RAS 301. Therefore, in the conventional technique, in a case where a return instruction which cannot be handled with a return address, the accuracy of the branch prediction is improved by using the branch history 302 together with the RAS 301.

To solve the above-described problems, Patent Document 2 is disclosed. Patent Document 2 has an aspect including a first RAS for storing a return address until a call instruction is executed, and a second RAS for storing the return address after the call instruction is executed. A return target can be predicted by using the first RAS until the call instruction is executed, and by using the second RAS after the call instruction is executed. At this time, it is determined which address an output selection circuit selects in accordance with information detected by the branch history.

[Patent Document 1] Japanese Patent Application Publication No. 2000-172507
[Patent Document 2] Japanese Patent Application Publication No. 2006-40173

However, the inventors found out that the conventional techniques have the following problems. The conventional techniques predict the presence of a subroutine call/return instruction using the branch history. For the branch history, when the capacity is large, the effect of a branch prediction is increased; however, when the circuit size is increased, it becomes very costly. Therefore, to perform a branch prediction with high accuracy, it is necessary to use a costly branch history. In addition, there is a problem that the branch history needs a period of time to learn a past history.

SUMMARY OF THE INVENTION

As a first exemplary aspect of the present invention, a branch prediction control device includes a prediction return address generation unit which generates a prediction return address according to a call instruction, a first return address storage unit which stores the prediction return address, a second return address storage which stores a return address to be generated in response to an execution result of the call instruction, and a branch prediction address storage unit which stores the prediction return address, sending the prediction return address as a branch prediction address, and storing the sent branch prediction address. When the branch prediction address differs from a return address which is generated after the execution of a branch instruction or a return instruction, a content stored in the second return address storage unit is copied to the first return address storage unit.

As a second aspect of the present invention, a branch prediction method of performing a branch prediction in an information processing unit which performs a pipeline process, the branch prediction method, includes storing a first return address which corresponds to a call instruction, and which is speculatively predicted, at a time of fetching the call instruction, storing a second return address corresponding to the call instruction at a time of executing the call instruction, determining whether the first and second returns addresses agree with each other, performing a subsequent branch prediction by using the first return address when the first and second return addresses agree with each other, and copying the second return address to a storage unit of the first return address, and performing a subsequent branch prediction using the copied return address when the first and second return addresses do not agree with each other.

By using the above-described configuration, a mechanism can be provided, by which a branch prediction can be performed, with high accuracy, on a return address by a return instruction from a subroutine call, only with a return address stack without using a costly resource such as a branch history.

BRIEF DESCRIPTION OF THE DRAWINGS

The above and other exemplary aspects, advantages and features of the present invention will be more apparent from the following description of certain exemplary embodiments taken in conjunction with the accompanying drawings, in which.

DETAILED DESCRIPTION OF THE EXEMPLARY EMBODIMENTS

Embodiment 1 of the Invention

Figure 1:
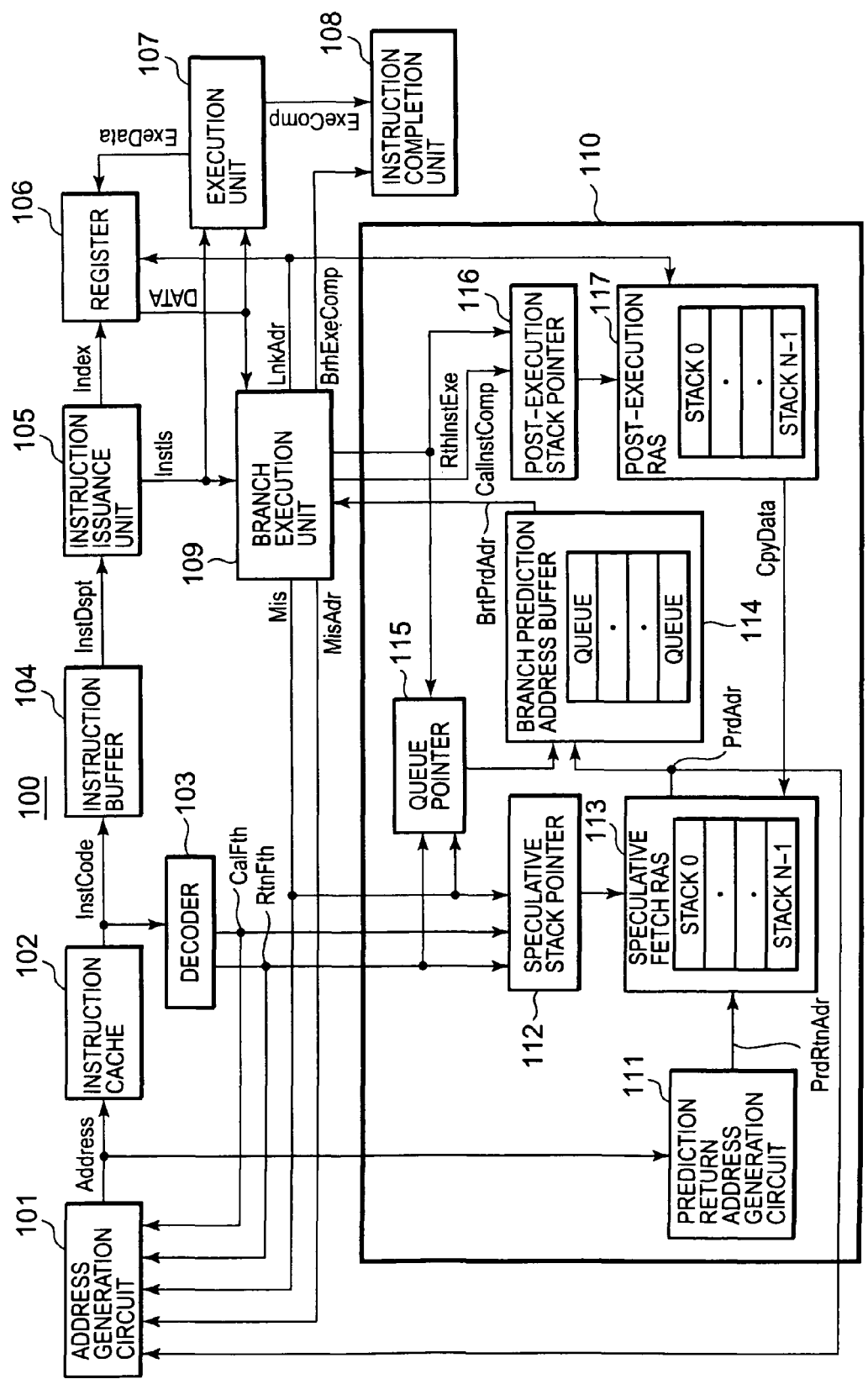
FIG. 1 is a block diagram of an information processing unit having a branch prediction control mechanism according to a first exemplary embodiment.

With reference to the drawings, a branch prediction control mechanism and a method thereof of a first embodiment will be described. FIG. 1 is a block diagram illustrating a configuration of an information processing unit 100 of the first embodiment. Here, shown is an example on the branch prediction control mechanism formed in the information processing unit 100 such as a microprocessor. In FIG. 1, parts related to the first embodiment are shown.

In the first embodiment, the branch prediction control mechanism in a case where a pipeline process of an instruction fetch is performed is exemplified. The information processing unit 100 performs a process on the basis of data stored in a storage unit. In the information processing unit 100, a set of instructions is stored in an instruction cache 102 in advance. Further, an address generation circuit 101 generates an address in accordance with a program, and transfers the address to the instruction cache 102; a set of instructions read from the instruction cache 102 is transferred to an instruction buffer 104 in the information processing unit 100. This operation is common to all the instructions. Reading a set of instructions from the instruction cache 102 is referred to as an instruction fetch. Further, once an instruction is read from the instruction cache 102, the instruction is decoded in a decoder 103; the decoder 103 transfers its result to the address generation circuit 101, and generates an address for a subsequent fetch. For example, when a subroutine is executed, a call instruction is fetched, and thereafter the subroutine is executed. When the execution of the subroutine is complete, the process is returned to the main routine by a return instruction.

The pipeline is a general method in which hardware processes are performed in parallel to improve the performance. The idea of the pipeline is briefly described using assembly-line operations performed in manufacturing lines for automobiles, electronic component factories, and the like.

A process with N operations each requiring one unit hour needs N hours to be executed in general. When this is allocated to N operators in an assembly-line operation, one product is completed in each unit hour. Therefore, the process speed is improved to N times the present one. This is the principle of the pipeline.

That is, the completion of one product corresponds to an instruction fetch in an information processing unit, operations necessary for performing the instruction fetch are caused to overlap so that throughput of the instruction fetch can be improved. Here, each of the above-described operations is referred to as a stage of a pipeline. The instruction fetch includes stages such as an instruction fetch stage IF, an instruction decode stage ID, an instruction issuance stage IS, a register fetch stage RF, an execution stage EX, a write-back stage WB, and an instruction completion stage CO. The content of the process in each stage will be described later.

Moreover, when a process of a stage is slow and the process is not completed in one unit hour, a trouble occurs in a pipeline process. Consequently, the process performance deteriorates. Thus, a factor, which disturbs the execution of the operation of a pipeline stage, is referred to as a hazard. A branch instruction is a factor inducing the hazard.

The information processing unit, which performs a pipeline process, executes an instruction fetch on a number of instructions in an assembly-line operation. There is a case that when a branch instruction is issued at the time of instruction fetching, whether to fetch a subsequent instruction from a branch target or from the immediately following address cannot be determined until the branch instruction is executed. In that case, when the instruction fetch is suspended until a branch direction is determined after the execution of the branch instruction, the instruction execution is discontinued. Consequently, the process efficiency is degraded. To prevent this from occurring, whether to branch the instruction is predicted, the instruction fetching is continued to load the instruction into a pipeline; this is a branch prediction. Furthermore, in accordance with a branch prediction, an instruction of a branch prediction target is executed in advance; this is referred to as a speculative execution.

The information processing unit 100 of FIG. 1 includes the address generation circuit 101, the instruction cache 102, the decoder 103, the instruction buffer 104, an instruction issuance unit 105, a register 106, an execution unit 107, an instruction completion unit 108, a branch execution unit 109, and a branch prediction control circuit 110.

The information processing unit 100 of the first embodiment is a CPU such as a microprocessor, for example. Further, the information processing unit 100 reads data and an instruction stored in a storage unit through an interface such as a bus, and executes the instruction.

The information processing unit 100 is a unit which processes information using a pipeline. The information processing unit 100 of the first embodiment has an aspect in which the information processing unit 100 performs an errata judgment of a branch prediction with high accuracy using only a speculative fetch RAS 113 and a post-execution RAS 117, without providing a return target of a return instruction to a branch history unlike a conventional technique. The speculative fetch RAS 113 is a return address stack storing a speculatively predicted address. In addition, the post-execution RAS 110 is a return address stack storing an address on which an instruction fetch is executed. These respective constituent elements of the information processing unit 100 will be described below.

The address generation circuit 101 generates an address (instruction address, and Address in the drawing) on the instruction cache 102 in which an instruction code read from a storage unit is stored. That is, the address generation circuit 101 outputs an instruction address to the instruction cache 102 in accordance with a program.

In the instruction cache 102, a set of instructions prepared in advance are stored as instruction codes (InstCode in the drawing). The instruction cache 102 outputs an instruction code in response to an instruction address from the address generation circuit 101, to the decoder 103 or the instruction buffer 104.

In the decoder 103, the instruction code inputted from the instruction cache 102 is decoded. That is, the decoder 103 determines whether the instruction code is a call instruction fetch or a return instruction fetch. This determination result is outputted to the address generation circuit 101 and the branch prediction control circuit 110.

The instruction buffer 104 outputs the stored instruction code as an instruction send signal InstDspt. The instruction issuance unit 105 receives the instruction send signal, and issues an instruction (InstIs in the drawing) to the branch execution unit 109 and the execution unit 107. Moreover, the instruction issuance unit 105 outputs index information (Index in the drawing) of the issued instruction to the register 106. The index information is information indicative of a number for a register in which data to be outputted among the data stored in the register 106 is stored.

The register 106 is a storage unit for storing the results of operation processes performed in the information processing unit 100. The register 106 stores operation data (ExeData in the drawing) outputted from the execution unit 107, and a link address (LnkAdr in the drawing) outputted from the branch execution unit 109, so that the operation data and the link address are associated with index information from the instruction issuance unit 105. In addition, stored data are transmitted to the execution unit 107 or the branch execution unit 109 as output data (DATA in the drawing).

The execution unit 107 performs an operation process on the basis of the instruction issued by the instruction issuance unit 105. Data generated by the operation are stored in the register 106. Further, instructions which the execution unit 107 performs are, for example, a logic operation, an INT operation, an FP operation, an SIMD operation, load/store, and the like. In addition, once the operation process is completed, the execution unit 107 outputs an operation complete signal (ExeComp in the drawing) to the instruction completion unit 108. The instruction completion unit 108 recognizes that a process for the instruction being executed is completed, on the basis of the operation complete signal or a branch process execution signal (BrhExeComp in the drawing) outputted from the branch execution unit 109.

When an instruction issued by the instruction issuance unit 105 is a call instruction, the branch execution unit 109 generates a link address acquired by executing the call instruction. This link address is stored in the register 106 and the post-execution RAS 117. Further, when an instruction issued by the instruction issuance unit 105 is a return instruction, it is determined whether a branch prediction return address speculatively fetched is correct. At this time, the branch execution unit 109 compares a branch prediction return address (BrhPrdAdr in the drawing) outputted from the branch prediction control circuit 110, and a link address read from the register 106. In addition, when the comparison result turns out that the branch prediction return address and the link address are different, a prediction miss signal (Mis in the drawing) is transmitted to each of the address generation circuit 101, a queue pointer 115, and a speculative stack pointer 112. Further, the branch execution unit 109 transmits a return address indicative of a correct branch target to the address generation circuit 101 as a miss address (MisAdr in the drawing). In addition, after executing the instruction, the branch execution unit 109 outputs a branch process execution signal (BrhExeComp in the drawing) which notifies the instruction completion unit 108 of the completion of the execution of the instruction. Here, the branch prediction return address is an instruction address of an instruction target, which is predicted by the branch prediction control circuit 110 and speculatively fetched.

The branch prediction control circuit 110 includes a prediction return address generation circuit 111, a speculative stack pointer 112, a speculative fetch RAS 113, a branch prediction address buffer 114, the queue pointer 115, a post-execution stack pointer 116, and the post-execution RAS 117.

The prediction return address generation circuit 111 is an example of a prediction return address generation means. When a call instruction is fetched, the prediction return address generation circuit 111 speculatively predicts a return address on the basis of an instruction address outputted from the address generation circuit 101. Further, the prediction return address generation circuit 111 generates a prediction return address (PrdRtnAdr in the drawing). Incidentally, the prediction return address is stacked on the speculative fetch RAS 113.

The speculative stack pointer 112 is an example of a first stack pointer, and includes a pointer indicative of a storage place of data in the speculative fetch RAS 113. Thereafter, a push process is performed on a value of the pointer on the basis of a call instruction fetch signal (CalFth in the drawing) outputted from the decoder 103. After performing the push process, the prediction return address is stacked on the speculative fetch RAS 113 according to the value of the pointer. Meanwhile, when the instruction code is a return instruction fetch, the speculative stack pointer 112 performs a pop process on the value of the pointer on the basis of a return instruction fetch signal (RtnFth in the drawing) outputted from the decoder 113. According to this pop process, the speculative fetch RAS 113 outputs the stored prediction return address. The prediction return address thus outputted is transmitted to the address generation circuit 101. The address generation circuit 101 speculatively fetches a subsequent instruction according to this prediction return address. In addition, the prediction return address is also stored in the branch prediction address buffer 114.

The speculative fetch RAS 113 is an example of a first return address storage means and is a distinctive device of the first embodiment. The speculative fetch RAS 113 stores a return address, corresponding to a speculatively predicted call instruction, at the time of call instruction fetching. The speculative fetch RAS 113 has a stack structure to which first inputted data are last outputted. The speculative stack pointer 112 controls data input or output of the speculative fetch RAS 113.

For example, in the speculative fetch RAS 113, a prediction return address is stored at the time of call instruction fetching. At this time, a push process is performed on the speculative stack pointer 112. That is, the stack pointer of the speculative stack pointer 112 is advanced by "1." Further, at the time of return instruction fetching, the speculative fetch RAS 113 outputs a stored prediction return address to the address generation circuit 101 and the branch prediction address buffer 114. At this time, a pop process is performed on the speculative stack pointer 112. That is, the stack pointer of the speculative stack pointer 112 is returned by "1." As described above, the speculative stack pointer 112 controls the designation and reading of a prediction return address stored in the speculative fetch RAS 113.

The speculative stack pointer 112 is set to "+1" at the time of call instruction fetching, or set to "−1" at the time of return instruction fetching. For example, as for the stack pointer controlling both the write pointer and the read pointer, the relationship among the stack pointer, the write pointer, and the read pointer are the stack pointer=the write pointer, and the stack pointer−1=the read pointer. That is, a prediction return address outputted from the speculative fetch RAS 113 is outputted from a stack of the stack pointer−1.

Figure 2:
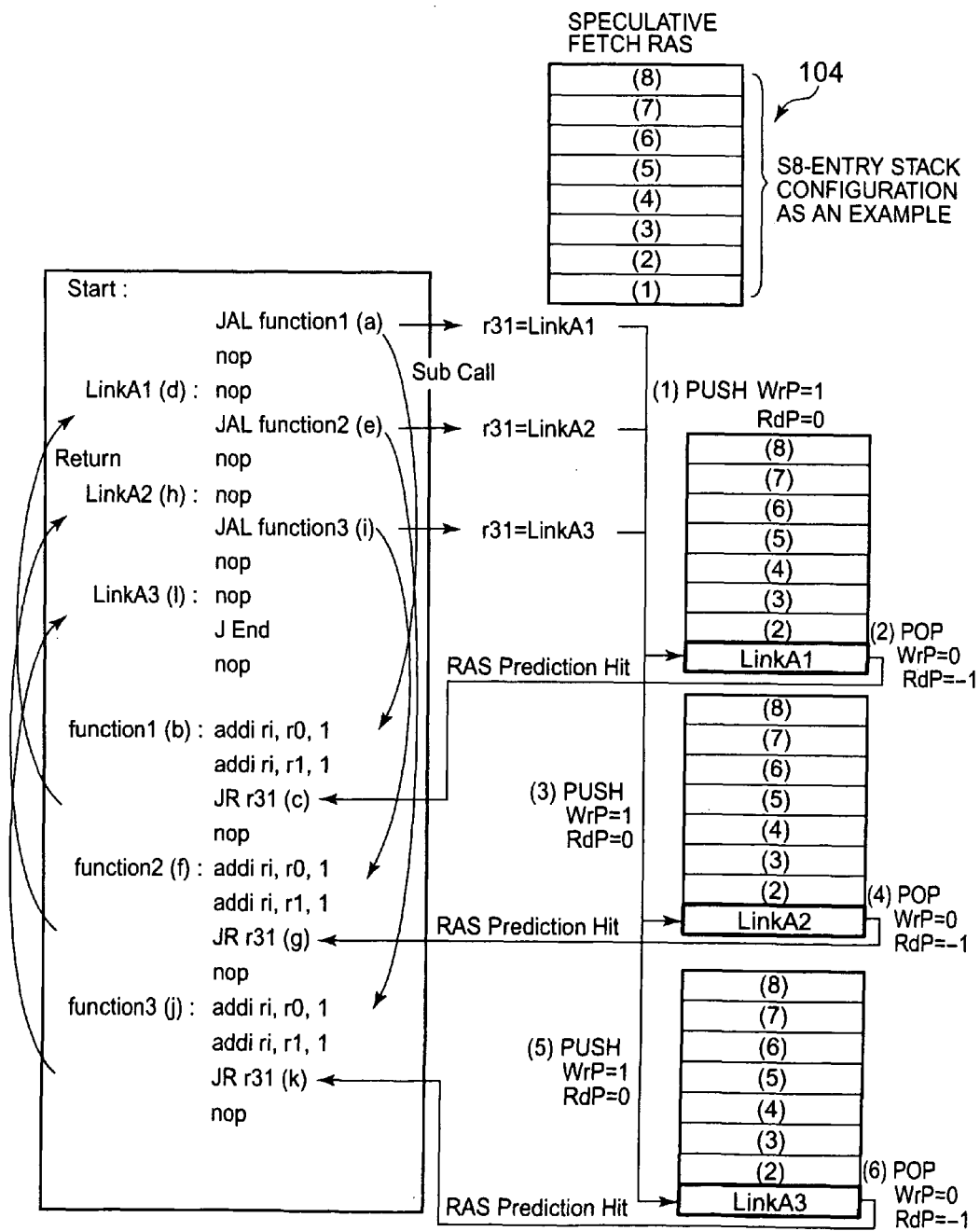
FIG. 2 is a diagram illustrating a configuration and an updating method of a speculative fetch RAS according to the first embodiment.

Referring to FIG. 2, the speculative fetch RAS 113 will be described in detail. FIG. 2 is a diagram exemplarily illustrating a basic configuration and ideal updating of the speculative fetch RAS 113 of the first embodiment. In FIG. 2, for example, an example of a program shown by a MIPS system instruction set is shown on the left hand part of the drawing.

For the program of FIG. 2, a main routine starting from Start, and subroutines of functions 1 to 3 are shown. That is, an operation is shown, in which a subroutine is called from the main routine to process some instructions, and the process returns from the subroutine to the main routine. This corresponds to an execution of a branch instruction. In an MIPS system set, a JAL instruction is a call instruction, and a JR r31 instruction is a return instruction.

On the part right above of FIG. 2, a basic structure of the speculative fetch RAS 113 is shown. The speculative fetch RAS 113 shown in FIG. 2 has an exemplary stack configuration of eight entries, and a transition of a state in which the program progresses is shown; however, the number of entries is not necessarily limited to eight.

In the program shown in FIG. 2, a subroutine (function 1) of (b) is first called by a call instruction (JAL instruction) of (a). Thereafter, a return address (LinkA1), to which the process is returned after the process of the subroutine (b) is completed, is speculatively predicted and stored in the speculative fetch RAS 113. That means that a push process of (1) is performed. At the same time, a write pointer (WrP) of the stack pointer is set to "1," and a read pointer (RdP) is set to "0."

Next, when the return address speculatively predicted in (1) is correct, the process is returned to the return address (LinkA1) by the return instruction (JR r31 instruction). That means that a pop process of (2) is performed. At the same time, the write pointer of the stack pointer is set to "0," and the read pointer is set to "−1."

In FIG. 2, shown is an example in which the stack pointer controls the write pointer and the read pointer separately. The initial values of the respective pointers are such that the write pointer=0, and the read pointer=−1. When the push process is performed, the write pointer and the read pointer advance to 1. Incidentally, the stack pointer is also capable of controlling both the write pointer and the read pointer, but not separately.

Returning to the program of FIG. 2, a subroutine (function 2) of (f) is similarly called by a call instruction (JAL instruction) of (e). Thereafter, a return address (LinkA2), to which the process is retuned after the process of the subroutine (f) is complete, is speculatively predicted and stored in the speculative fetch RAS 104. That means that a push process of (3) is performed. At the same time, the write pointer of the stack pointer is set to "1," and the read pointer is set to "0."

Next, when the return address speculatively predicted in (3) is correct, the process is retuned to the return address (LinkA2) by a return instruction (JR r31 instruction) of (g). That is, a push process of (3) is performed. At the same time, the write pointer of the stack pointer is set to "0," and the read pointer is set to "−1." For the processes of (5) and (6), the same is true of the above-described processes, so that further description is omitted.

Figure 3:
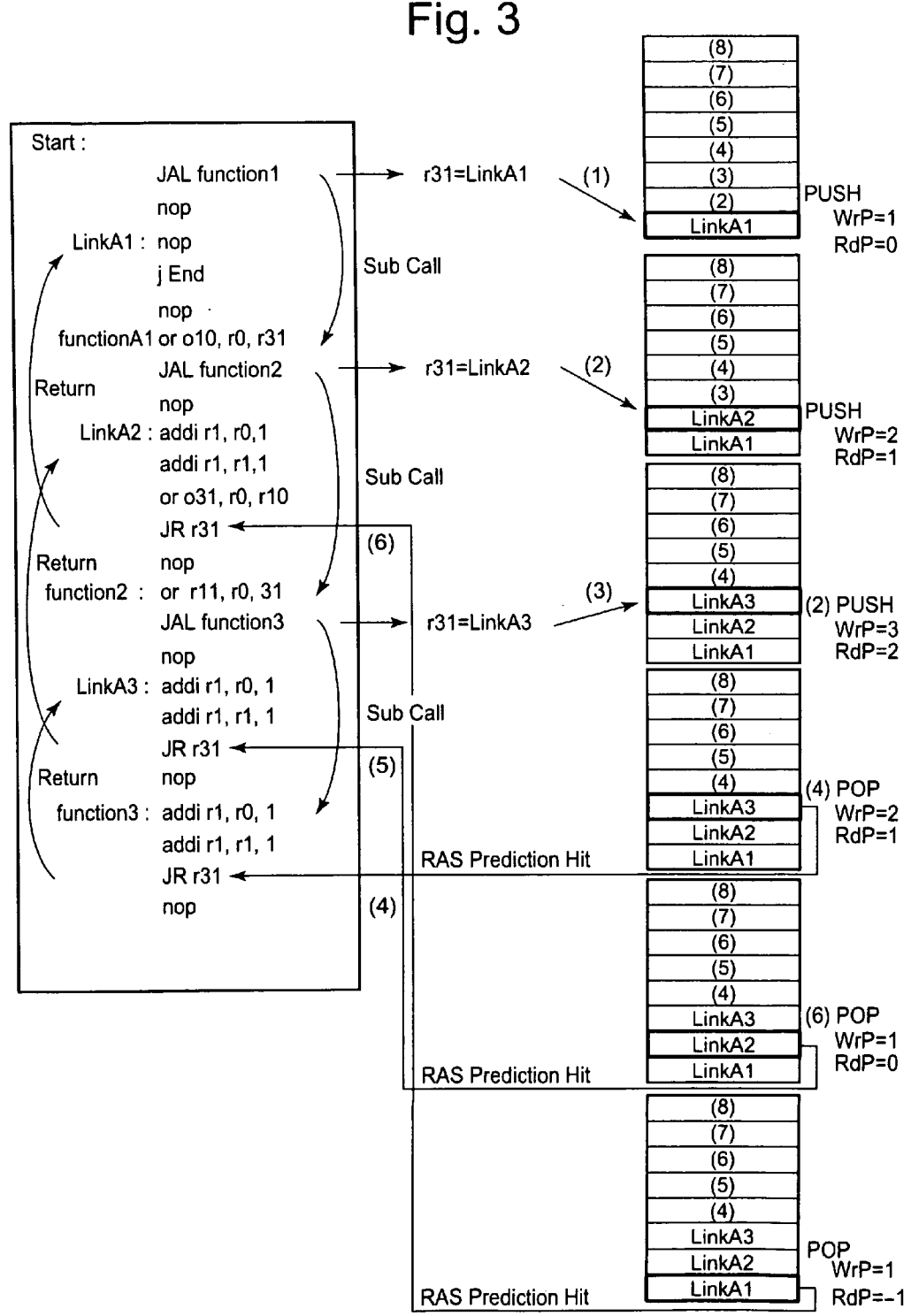
FIG. 3 is a diagram illustrating a configuration and an updating method of the speculative fetch RAS according to the first embodiment.

Incidentally, for the speculative fetch RAS 113, the order of storing the prediction return addresses in the stack entries is not limited to the one shown in FIG. 2. The order of storing the same in stack entries can be the one shown in FIG. 3. In the case of the speculative fetch RAS 113 shown in FIG. 2, information on the return address is stacked only in one entry. In FIG. 3, the push processes of (1), (2), and (3) are performed, and return addresses (LinkA1, LinkA2, and LinkA3) correspond thereto are stacked in the speculative fetch RAS 113. Here, return addresses to be stored in the speculative fetch RAS 113 by the push process increase so as to have a configuration in which stack becomes deep. Further, by the pop processes of (4), (5), and (6), the processes are returned to their own return addresses.

As shown in FIGS. 2 and 3, in the basic speculative fetch RAS 113, a prediction return address calculated when a speculative call instruction is fetched is written by a push process, and read by a pop process when the return instruction is speculatively fetched. These processes are different from the RAS shown in Patent Document 1, and performed before the completion of the instructions.

Returning to FIG. 1, the description of the information processing unit 100 is continued below. The branch prediction address buffer 114 is an example of the branch prediction address storage means, and stores a predicted return address using the speculative fetch RAS 113. The prediction return stored in the branch prediction address buffer 114 is read at the time of the execution of a return instruction. The prediction return address is used to determine whether the branch prediction is correct by comparing the prediction return address with the return address to be actually executed. While a candidate of a predicted return address is stored in the speculative fetch RAS 113, the address used for the prediction is stored in the branch prediction address buffer 114. That is, the prediction return address read at the time of return instruction fetching is stored.

Further, the branch prediction address buffer 114 is different from a stack structure, and has a queue structure (queue) in which first inputted data is first outputted. Further, the branch prediction address buffer 114 is controlled with respect to the inputted/outputted data by the queue pointer 115. The queue pointer 115 includes, for example, a write pointer WrP and a read pointer RdP. The write pointer WrP and the read pointer RdP are pointers each, which set an initial value to "0," and a maximum value to "the number of queues−1." The write pointer WrP is set to +1 at the time of return instruction fetching. In addition, when a branch prediction is incorrect, the value of the write pointer WrP becomes a value obtained by adding "1" to the read pointer RdP at that time. Meanwhile, the read pointer RdP is set to +1 at the time the performing of a return instruction.

The post-execution RAS 117 is an example of a second return address storage means, and stores a return address corresponding to a return instruction, at the time of the execution of a call instruction. That is, the post-execution RAS 117 is a storage means in which a correct return address is stored by executing a call instruction, not a return address speculatively predicted. The post-execution RAS 117 has a stack structure in which data inputted earlier are outputted later as in the speculative fetch RAS 113, and has a structure of the speculative fetch RAS 113 shown in FIGS. 2 and 3. The post-execution stack pointer 116 controls data input or output of the post-execution RAS 117. The post-execution stack pointer 116 is an example of a second stack pointer.

For example, when a call instruction is issued and an instruction is executed, the post-execution RAS 117 stores therein a correct return address calculated in the branch execution unit 109. At this time, the post-execution stack pointer 116 performs a push process on a value of a pointer according to a call instruction completion signal (CallnstComp in the drawing) outputted from the branch execution unit 109. That is, the post-execution stack pointer 116 advances the stack pointer by "1." Meanwhile, when a return instruction is issued and an instruction is executed, the post-execution stack pointer 116 performs a pop process on a value of a pointer according to a return instruction execution signal (RtnInstExe in the drawing) outputted by the branch execution unit 109. That is, the post-execution stack pointer 116 returns the stack pointer by "1." As described above, the post-execution stack pointer 116 controls the designation and reading of a return address stored in the post-execution RAS 117.

The post-execution stack pointer 116 is set to +1 at the time of the execution of a call instruction, and to −1 at the time of a return instruction. Further, the stack pointer is capable of controlling a write pointer and a read pointer separately, and also capable of controlling a write pointer and a read pointer without separating. Further, the post-execution stack pointer 116 also includes a completion stack pointer (CP: hereinafter, referred to as a commit pointer). The commit pointer is set to +1 at the time of the completion of a call instruction, and to −1 at the time of the completion of a return instruction. The commit pointer will be described in detail later.

Figure 4:
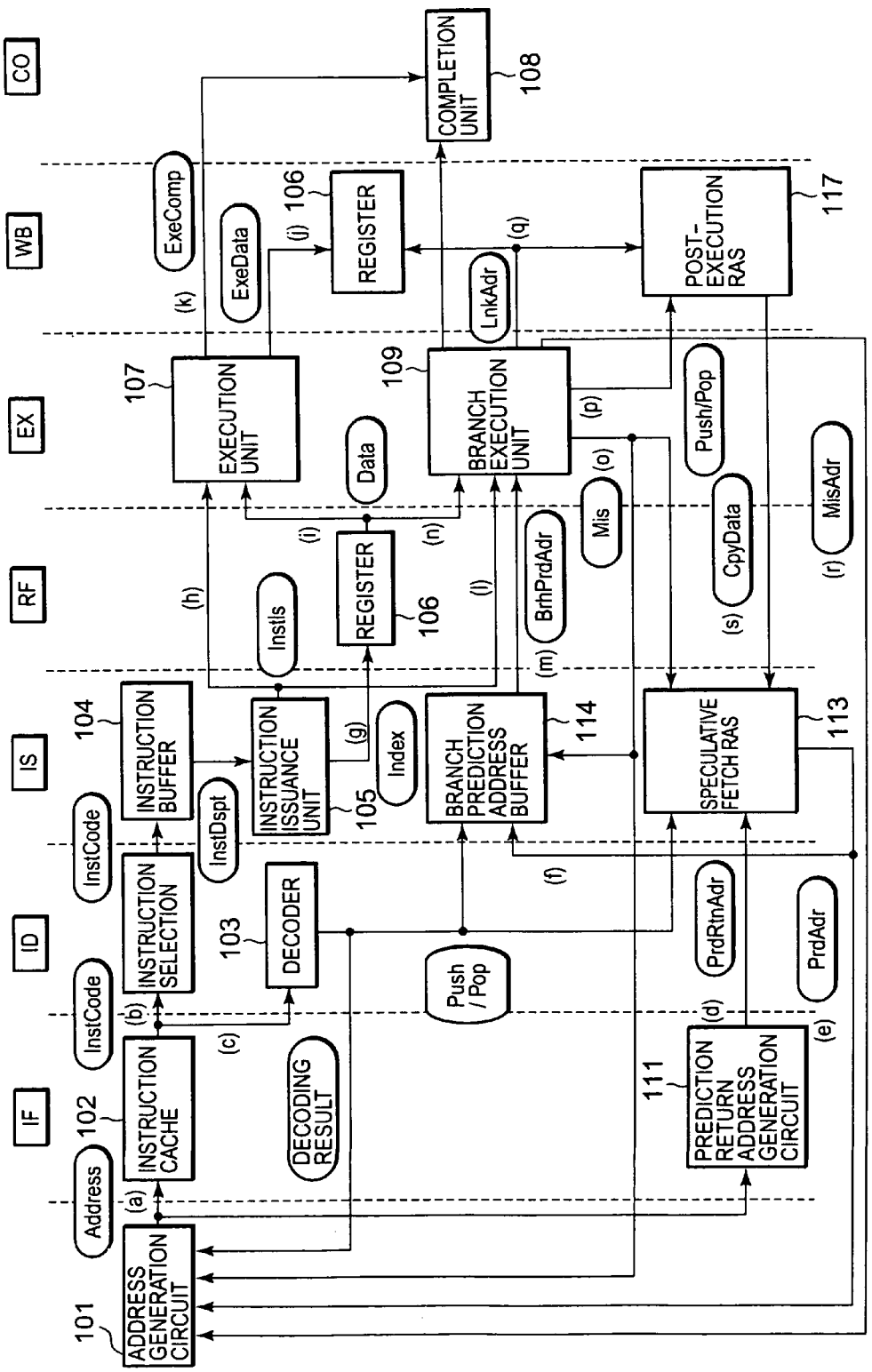
FIG. 4 is a diagram illustrating process operations of a branch prediction control device according to the first embodiment.

Next, a process operation of the information processing unit 100 of the first embodiment will be specifically described. FIG. 4 is a diagram illustrating process operation, divided for each instruction stage, of the information processing unit 100 of the first embodiment. Further, a pipeline stage of a call/return instruction is divided and described as an example. Stages are divided into an IF (an instruction fetch stage), an ID (an instruction decode stage), an IS (an instruction issuance stage), an RF (a register fetch), an EX (an execution stage), a WB (a write-back stage), and a CO (an instruction completion stage).

The IF stage is a stage which reads an instruction code from the instruction cache 102. The ID stage is a stage which decodes an instruction code using the decoder 103. The IS stage is a stage which issues an instruction in accordance with the instruction code thus read. The RF stage is a stage which reads data from the register 106 in which information to be used for a process is stored. The EX stage is a stage which executes the instruction in accordance with the instruction code for data outputted from the register 106; the EX stage is a stage in which when the instruction is a call instruction, an address of a return target is calculated, and in which when the instruction is a return instruction, a return address of a branch target is decided. The WB stage is a stage in which the result of the calculation in the EX is stored in the register 106 or the post-execution RAS 117. The CO stage is a stage indicative of the completion of the instruction. The operation to be performed in the respective stages will be described below.

First, an operation in which a call instruction is fetched and executed will be described. In this case, first, the address generation circuit 101 generates an instruction address (a). Subsequently, in the IF stage, the instruction cache 102 outputs an instruction code in accordance with the instruction address. Further, the prediction return address generation circuit 111 generates a prediction return address on the basis of the instruction address (d).

In the ID stage, an instruction code fetched from the instruction cache 102 is selected (b). The instruction code thus selected is outputted to the instruction buffer 104. Further, the instruction code fetched from the instruction cache 102 is transmitted to the decoder 103 (c). The decoder 103 decodes the instruction code, and transmits the decoded result to the address generation circuit 101. When the decoded result of the instruction is the call instruction, push processes are further performed on values of the speculative stack pointer 112 and the queue pointer 115. Incidentally, the decoded result of the call instruction transmitted to the address generation circuit 101 is information for generating a call target address as the next instruction address in the address generation circuit 101.

In the IS stage, an instruction call fetched from the instruction buffer 104 and stored therein is outputted to the instruction issuance unit 105 along with an instruction send signal. The instruction issuance unit 105 performs an output of index information (g), and issuances of an instruction (h), (l). Further, the speculative fetch RAS 113 receives a decode result of a call instruction in the ID stage, and stores a prediction return address based on a push process performed in the speculative stack pointer 112.

In the RF stage, the register 106 outputs data stored in the address designated in index information (i) and (n). In the EX stage, the execution unit 107 performs a process on data transmitted from the register 106 according to the instruction issued by the instruction issuance unit 105. Further, a result of the process is transmitted to the register 106 as operation data (j). Further, once the execution of the instruction is completed, the execution unit 107 transmits an instruction completion signal to the completion unit (k). Meanwhile, the branch execution unit 109 generates a link address according to the call instruction issued by the instruction issuance unit 105 (q). This link address is a return address acquired by executing a call instruction. In addition, this link address is transmitted to the post-execution RAS 117 and the register 106. At this time, the branch execution unit 109 performs a push process on the post-execution stack pointer 116.

In the WB stage, the register 106 stores therein the operation data transmitted from the execution unit 107, and the link address transmitted from the branch unit. Moreover, the post-execution RAS 117 stores the link address sent from the branch execution unit 109 according to the pointer value of the post-execution stack pointer 116. Then, in the CO stage, the branch execution unit 109 performs a push process on the post-execution stack pointer 116.

In accordance with the above-described procedure, the call instruction is fetched, and the prediction return address for fetching the instruction following the speculative return instruction and the return address after the execution of the call instruction are stored in the speculative fetch RAS 113 and the post-execution RAS 117.

Subsequently, an operation in which a return instruction is fetched and executed will be described. In this case, first, the address generation circuit 101 generates an instruction address (a). Thereafter, in the IF stage, the instruction cache 102 outputs an instruction code according to the instruction address.

In the ID stage, an instruction code fetched from the instruction cache 102 is selected (b). The selected instruction code is outputted to the instruction buffer 104. The instruction code fetched from the instruction cache 102 is transmitted to the decoder 103 (c). The decoder 103 decodes the instruction code, and transmits the decoded result of the instruction code to the address generation circuit 101. When the decoded result of the instruction is a return instruction, a pop process is performed on the value of the speculative stack pointer 112. Incidentally, the decoded result of the return instruction transmitted to the address generation circuit 101 is information for generating a return target address as the next instruction address in the address generation circuit 101. That is, the address generation circuit 101 selects a prediction return target address transmitted from the speculative fetch RAS 113, and generates the same as a subsequent instruction address.

In the IS stage, an instruction code fetched by the instruction buffer 104 and stored therein is outputted to the instruction issuance unit 105 along with an instruction send signal. The instruction issuance unit 105 outputs index information (g) and issues the instruction (h), (l) according to the instruction send signal. Further, the speculative fetch RAS 113 receives the decoded result of the return instruction in the ID stage, and transmits, as a prediction address (e), a prediction return address to the address generation circuit 101. The address generation circuit 101 generates this prediction address to the instruction cache 102 as an address of the subsequent instruction. A pop process is performed on the speculative stack pointer 112 after transmitting the prediction return address. Further, the decoder 103 receives the decoded result of the return address, and the branch prediction address buffer 114 stores, in the IS stage, the prediction return address sent out from the speculative fetch RAS 113. At this time, the queue pointer 115 is processed. The branch prediction address buffer 114 transmits, in response to the queue pointer 115, the prediction return address as a branch prediction address (m) to the branch execution unit 109.

In the RF stage, the register 106 outputs data stored in a register number designated in the index information (i) and (n). In the EX stage, the execution unit 107 performs a process on data to be transmitted from the register 106, according to the instruction issued by the instruction issuance unit 105. Thereafter, a processing result of the data is transmitted to the register 106 as operation data (j). Further, once the execution of the instruction is complete, the execution unit 107 transmits an instruction completion signal to the completion unit (k). Meanwhile, the branch execution unit 109 reads a link address generated at the time of the execution of the call instruction stored in the register according to the return instruction issued by the instruction issuance unit 105. Thereafter, this link address and the branch prediction address to be outputted from the branch prediction address buffer 114 are compared. Here, when a compared result is correct, the branch execution unit 109 performs a pop process on the post-execution stack pointer 116. In general, when there is no other branch instruction after the call instruction, a return target at the time of the execution of the return instruction is the branch target predicted in accordance with the call instruction.

In the WB stage, the register 106 stores therein the operation data transmitted from the execution unit 107, and the link address transmitted from the branch unit. Further, the post-execution RAS 117 stores therein the link address transmitted from the branch execution unit 109 according to the pointer value of the post-execution stack pointer 116. In the CO stage, the branch execution unit 109 performs a pop process on the commit pointer of the post-execution stack pointer 116.

In accordance with the above-described procedure, a process in the case where a return instruction is fetched is performed. However, there is a case that there exists an instruction, such as a condition branch instruction, between a call instruction and a return instruction. In such a case, an instruction speculatively fetched may be different from the instruction of the branch target to which the speculatively fetched instruction is actually branched. In the case where such a branch occurs, information of the speculative fetch RAS 113 is disturbed. Here, operation in such a case will be described. Here, the condition branch instruction is an instruction, for example, in which the process moves to a new branch target when an operation result previously obtained satisfies a predetermined condition. In this condition branch instruction, the case where a condition is satisfied so that the process moves to a new branch target is referred to as Taken, and the case where a condition is not satisfied so that the process proceeds along the present routine is referred to as Not Taken.

In this case, first, the address generation circuit 101 generates an instruction address (a). Subsequently, in the IF stage, the instruction cache 102 outputs an instruction code according to the instruction address.

In the ID stage, an instruction code is selected (b). Next, the instruction code is transmitted to the decoder 103. The decoder 103 decodes the instruction code and transmits the decoded result to the address generation circuit 101 when the instruction code is a condition branch instruction. In the present description, the address generation circuit 101 generates the branch target prediction address according to the decoded result transmitted above, when the fetched condition branch instruction is a Taken prediction. In the following description of FIG. 4, assume that the condition branch instruction is predicted as Taken.

In the IS stage, the instruction buffer 104 outputs an instruction send signal to the instruction issuance unit 105 according to the instruction selected in the IS stage. The instruction issuance unit 105 outputs index information (g) and issues the instruction (h) according to the instruction send signal.

In the RF stage, the register 106 outputs data stored in a register number designated in the index information (i) and (n).

In the EX stage, the execution unit 107 performs a process on data to be transmitted from the register 106, according to the instruction issued by the instruction issuance unit 105. Thereafter, a processing result of the data is transmitted to the register 106 as operation data (j). Further, once the execution of the instruction is complete, the execution unit 107 transmits an instruction completion signal to the completion unit (k). Meanwhile, the branch execution unit 109 reads the operation result stored in the register according to the condition branch instruction issued by the instruction issuance unit 105 (n). In addition, it is determined whether the operation result agrees with the condition of the branch instruction. Here, when the determination result is the Taken, a Taken prediction is performed at the time of fetching of the condition branch instruction, so that the subsequent process is continued. Meanwhile, when the determination result is the Not Taken, the branch prediction is incorrect, so that a branch prediction miss and an incorrect address are transmitted to the address generation circuit 101 (o) and (r). The address generation circuit 101 generates an instruction address in the correct branch direction according to this incorrect address.

In the WB stage, when the branch condition is the Taken in the EX stage, data speculatively performed and operated are stored in the register 106 as operation data. On the other hand, when the branch condition is the Not Taken in the EX stage, there is a branch prediction miss, so that the correct branch address stored in the post-execution RAS 117 is copied to the speculative fetch RAS 113 (s). Thus, information stored in the speculative fetch RAS 113 is corrected to the correct one. Incidentally, when the branch prediction is incorrect, a pointer of the queue pointer 115 of the branch prediction address buffer 114 is returned to an initial value.

Further, in the CO stage, when the branch condition is the Taken in the EX stage, an ongoing process is continued without interruption. Meanwhile, when the branch condition is the Not Taken in the EX stage, respective blocks are instructed to discard the process of the instruction which has been speculatively performed. Thus, the process of the instruction which has been speculatively performed is discontinued.

As described above, when the branch prediction fails, the post-execution RAS 117 copies the contents stored in the post-execution RAS 117 to the speculative fetch RAS 113. Accordingly, a correction of the disturbance in the speculative fetch RAS 113 can be made by copying the contents of the post-execution RAS 117. As the RAS in a conventional technique, when a branch prediction miss occurs, a speculative fetch RAS is cleared so that an initial value is restored, and therefore, it is not necessary to restart from the beginning of the process. Therefore, the efficiency of the process is improved.

Figure 5:
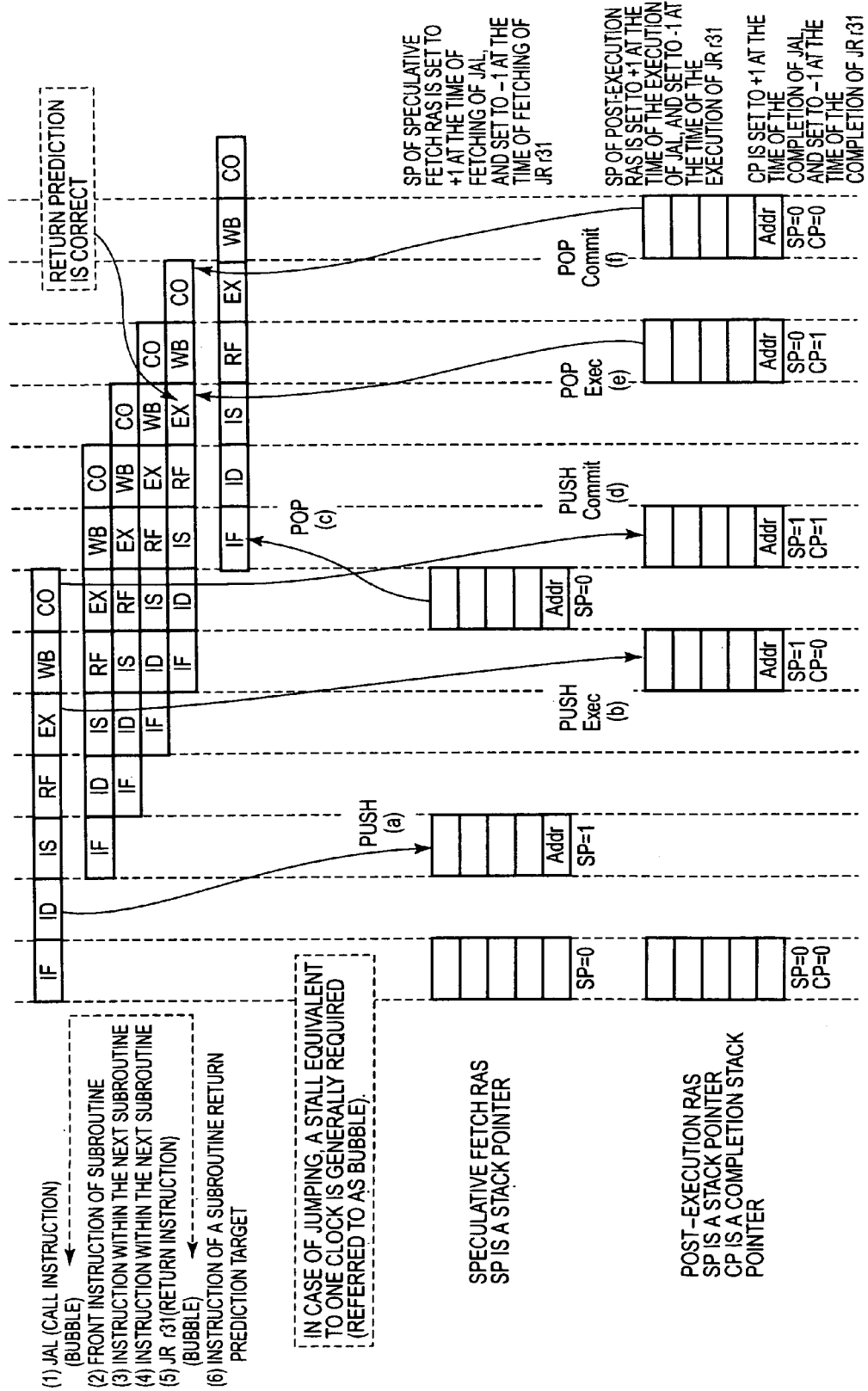
FIG. 5 is a diagram illustrating a pipeline operation of a basic call/return instruction according to the first embodiment.

Next, referring to FIGS. 5 to 7, states of the speculative fetch RAS and the post-execution RAS at the time of the above-described operation will be described in detail. FIG. 5 is a diagram illustrating a pipeline operation of a basic subroutine call/return instruction in the case where a branch prediction is normally completed.

On the upper part of FIG. 5, the flow of a call/return instruction is illustrated. That is, shown are three subroutine instructions (2) to (4), which are speculatively executed, between "JAL" (call instruction) of (1) and "JR r31" (return instruction) of (5). On the last line, shown is a state in which "an instruction of a subroutine return prediction target" is executed, and the return prediction is correct so that the branch prediction is normally completed. On a lower part, a "speculative fetch RAS" and a "post-execution RAS" of the first embodiment are exemplified, and a storing state which changes in response to the progress of the above instruction are shown. Incidentally, the "speculative fetch RAS" and the "post-execution RAS" are the same as the "speculative fetch RAS 113" and the "post-execution RAS 117."

Each instruction has the above-described stages of seven levels from the IF stage to the CO stage, and is shown on the horizontal axis in time series. Incidentally, one level is shown to represent one clock. In FIG. 5, in accordance with the basic operation of the pipeline, each instruction is indicated to progress through overlapping every other clock. However, when an instruction jumps from a call instruction to a subroutine, or from a subroutine to a return instruction, a stall (referred to as a bubble) equivalent to one clock is required in general, so that a delay by two clocks occurs.

First, the "JAL" (call instruction) of (1) is started. In the case of a pipeline operation, subroutines are speculatively executed one after another before the completion (CO stage) of "JAL" of (1). In a "front instruction of a subroutine" of (2), a stall occurs due to a bubble so that the IF stage starts two clocks late; however, an "instruction within the next subroutine" of (3) starts one clock late from the IF stage of (2). In the same manner, an "instruction within the next subroutine" of (4) also starts one clock late from the IF stage of (3). Once all the instructions within the subroutines start, "JR r31" (return instruction) starts in (5). Further, an "instruction of a subroutine return prediction target" of (6) starts one clock later.

Here, on the prediction return address of a subroutine return target, a push process (a) is performed to a "speculative fetch RAS" in the ID stage of (1). That is, as described in FIG. 4, at the time of fetching a call instruction, the prediction return address generated by the address generation circuit 101 is stored in the speculative fetch RAS 113. Here, when the call instruction is fetched and the prediction return address is stored in the speculative fetch RAS 113, the speculative stack pointer 112 designates an entry in which the prediction return address is stored as a valid entry.

Further, in the EX stage of (1), a "JAL" instruction is executed, and a push process (b) is performed on an essential return address to the "post-execution RAS." That is, as described in FIG. 4, when a call instruction is executed, an essential return address calculated in the branch execution unit 109 is stored in the post-execution RAS 117. Here, when the call instruction is executed and the return address is stored in the post-execution RAS 117, the post-execution stack pointer 116 designates an entry in which the return address is stored as a valid entry.

Meanwhile, along with the start of (1), subroutines of (2) to (4), and "JR r31" (return instruction) of (5) are speculatively executed one after another. Finally, in the IF stage of (6), a prediction return address stacked in the "speculative fetch RAS" is processed with a pop process (c), and speculatively returned to its address. That is, as described in FIG. 4, when the return instruction is fetched, the prediction return address is read from the speculative fetch RAS 113 indicated by the speculative stack pointer 112, and is transmitted to the address generation circuit 101 as the subsequent instruction fetching address. Here, when the return instruction is fetched, the speculative stack pointer 112 controls reading the prediction return stored in a designated entry.

Thereafter, in the EX stage of (5), an essential return address stacked in the "post-execution RAS" is processed with a pop process (e). Thereafter, it is determined whether the return address processed with the pop process (e) agrees with a prediction return address processed with a pop process (c) in the IF stage of (6). That is, as described in FIG. 4, once a return instruction is executed, the branch execution unit 109 reads a correct return address from the post-execution RAS 117 indicated by the post-execution stack pointer 116. Thereafter, it is determined whether the correct return address agrees with the prediction return address. Here, when the return instruction is executed, the post-execution stack pointer 116 controls reading the return address stored in a designated entry.

FIG. 5 shows the case where the branch prediction is normally completed, so that the essential return address agrees with the prediction return address. Accordingly, the branch prediction is correct, and the process is normally executed.

As described above, the speculative fetch RAS 113 stores the prediction return address when the call instruction is fetched. Therefore, unlike Patent Document 1, it is not necessary to wait for the completion of an execution to proceed to the next instruction. As a result, as long as the speculative prediction is correct, it is possible to predict a branch target correctly even though the return instruction is fetched immediately after the completion of the execution.

Incidentally, in the "post-execution RAS," a completion stack pointer (CP: hereinafter, referred to as a commit pointer) is shown in addition to a stack pointer. The commit pointer is for controlling a storing state of the "post-execution RAS" at the time (CO stage) when the instruction is complete. For example, at the time when the call instruction is fetched and a push process (b) is performed on the essential return address in the "post-execution RAS," the stack pointer is advanced by 1, but the commit pointer is unchanged. The commit pointer is processed with a push process (d) at the beginning of the CO stage, and is advanced by 1. Further, when the return address is fetched, the essential return address is processed with a pop process (e) and read in the EX stage, the stack pointer is returned by 1, but the commit pointer is unchanged. At the beginning the CO stage, the commit pointer is processed with a pop process (f), and returned by 1. That is, the commit pointer has a function to designate the return address stored in the branch prediction control circuit 110 as a valid entry when the call instruction is complete.

Figure 6:
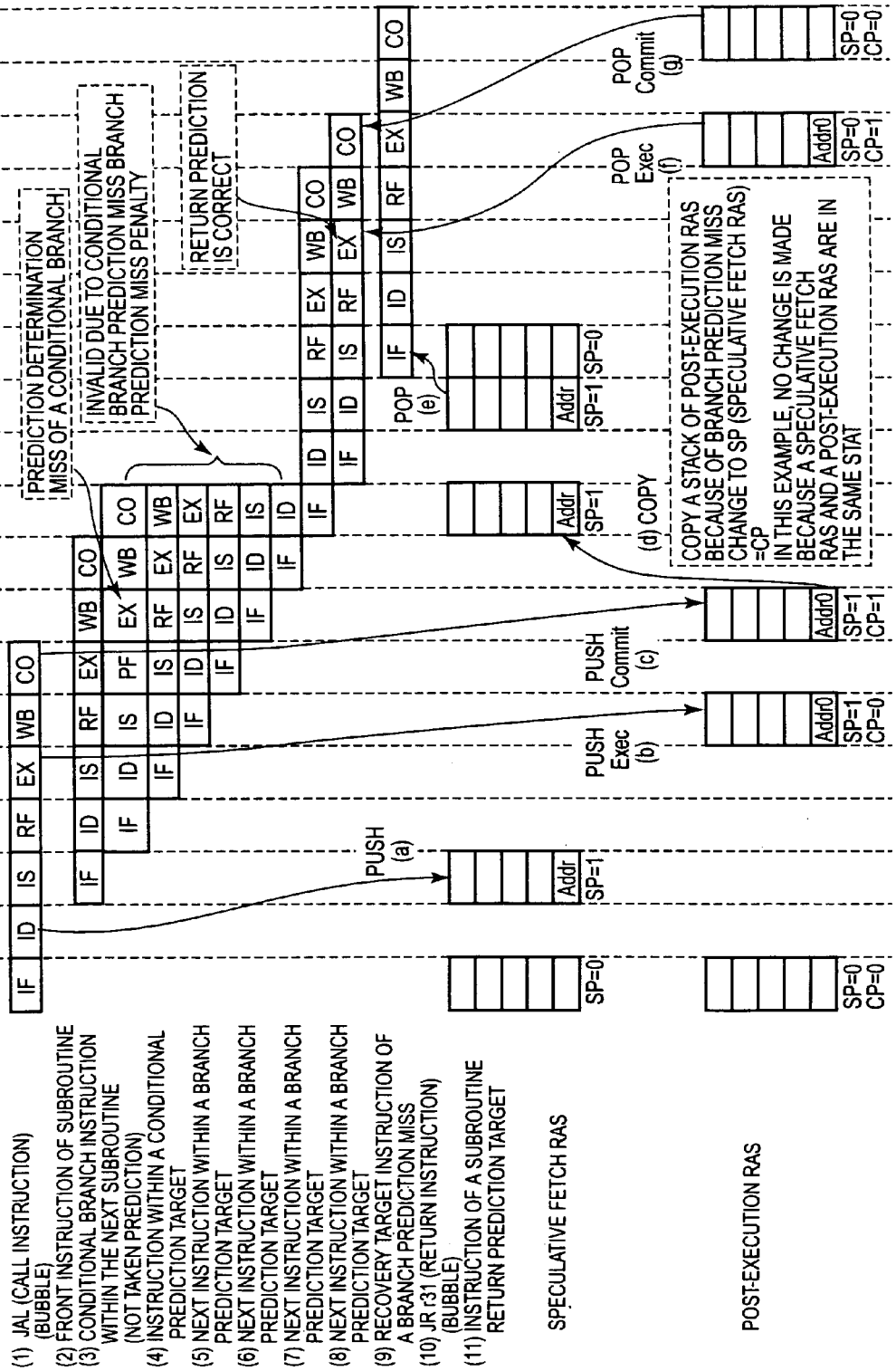
FIG. 6 is a diagram illustrating a pipeline operation of the basic call/return instruction according to the first embodiment.

Next, description is given referring to FIG. 6. FIG. 6 is a diagram illustrating a pipeline operation of a basic call/return instruction in the case where a miss has occurred in a branch prediction. As in FIG. 5, on the upper part of FIG. 6, the flow of a subroutine call/return instruction is illustrated; on the lower part, storing states of a "speculative fetch RAS" and a "post-execution RAS," which change according to a state of the proceeding of the above instruction, are shown.

Following a "JAL" instruction of (1), instructions within subroutines speculatively performed are shown in (2) and (3). In FIG. 6, since a conditional branch is further instructed in (3), instructions of branch prediction targets of (4) to (8) are speculatively executed one after another. However, FIG. 6 shows the case where there is a miss in a branch prediction. That is, shown is the case where a miss is found in the prediction determination of the conditional branch. Accordingly, the instructions of the branch prediction targets of (4) to (8) speculatively performed until the CO stage of (3) are invalidated, but a branch prediction miss is recovered in (9). Thereafter, on the last line, an "instruction of a subroutine return prediction target" is executed, and a return prediction is correct and thereby indicates a state in which the process is executed.

A relationship between the flow of the above process and the storing states of the "speculative fetch RAS" and the "post-execution RAS" is specifically described. Along with the start of the "JAL" instruction of (1), the subroutines of (2) and (3) are speculatively executed one after another. In (3), a conditional branch is further fetched by an instruction, and predicted as Not Taken, so that (4) to (8) are speculatively executed one after another while each being one clock late. Here, in the ID stage of (1), a prediction return address is processed with a push process (a) to the "speculative fetch RAS." Further, in the EX stage of (1), an essential return address is processed with a push process (b) to the "post-execution RAS." In the EX stage of (3), the condition branch instruction is executed a miss is found in the prediction determination. Therefore, the instructions of (4) to (8) speculatively performed until (3) proceeds to the CO stage are invalidated.

Here, in the first embodiment, a process in which the essential return address stored in the "post-execution RAS" is copied to the "speculative fetch RAS" (d) is performed. In FIG. 6, since the storing states of the "speculative fetch RAS" and the "post-execution RAS" are same, it appears that there is no change by copying.

Thereafter, in (9), the branch prediction miss of the conditional branch is recovered. The branch execution unit transmits a miss address to the address generation circuit 101 along with a branch prediction miss signal so as to generate a recovery address at which the branch predictions miss occurred.

Thereafter, in the EX stage of the "JR r31" instruction of (10), the essential return address on which a pop process (f) has been performed from the "post-execution RAS," and the prediction return address on which a pop process (e) has been performed in the IF stage of (11) are compared; when the essential return address and the prediction return address agree with each other, the process is executed.

As described above, in FIG. 6, a penalty is included in the processing time due to the branch prediction miss. However, copying the contents of the "post-execution RAS" to the "speculative fetch RAS" makes it possible to recover not from the initial state but in the middle of the process.

Next, description will be given with referring FIG. 7. As in FIG. 6, FIG. 7 is a diagram illustrating a pipeline operation of a basic call/return instruction in the case where a miss has occurred in a branch prediction of a conditional branch. However, unlike FIG. 6, FIG. 7 is a diagram illustrating the case where the JAL instruction is fetched in a branch prediction target before a miss in the branch prediction is found and the contents of the "speculative fetch RAS" are overwritten. As in FIG. 5, in FIG. 7, the flow of the call/return instruction is illustrated on the upper part, and the storing states of the "speculative fetch RAS" and the "post-execution RAS," which change according to the proceeding state of the above instruction are illustrated on the lower part.

Shown in (2) is an instruction within a subroutine to be speculatively performed along with the start of the "JAL" of (1). In FIG. 7, shown is the case where although a conditional branch is further made in (2), the conditional branch is performing a Not Taken prediction and determined as Taken at the time of execution, which indicates that there is a branch prediction miss. However, it is not determined that there exists a miss in the prediction determination of the conditional prediction until the EX stage of (2), and thus, the instructions subsequent to (3) are speculatively executed.

Figure 7:
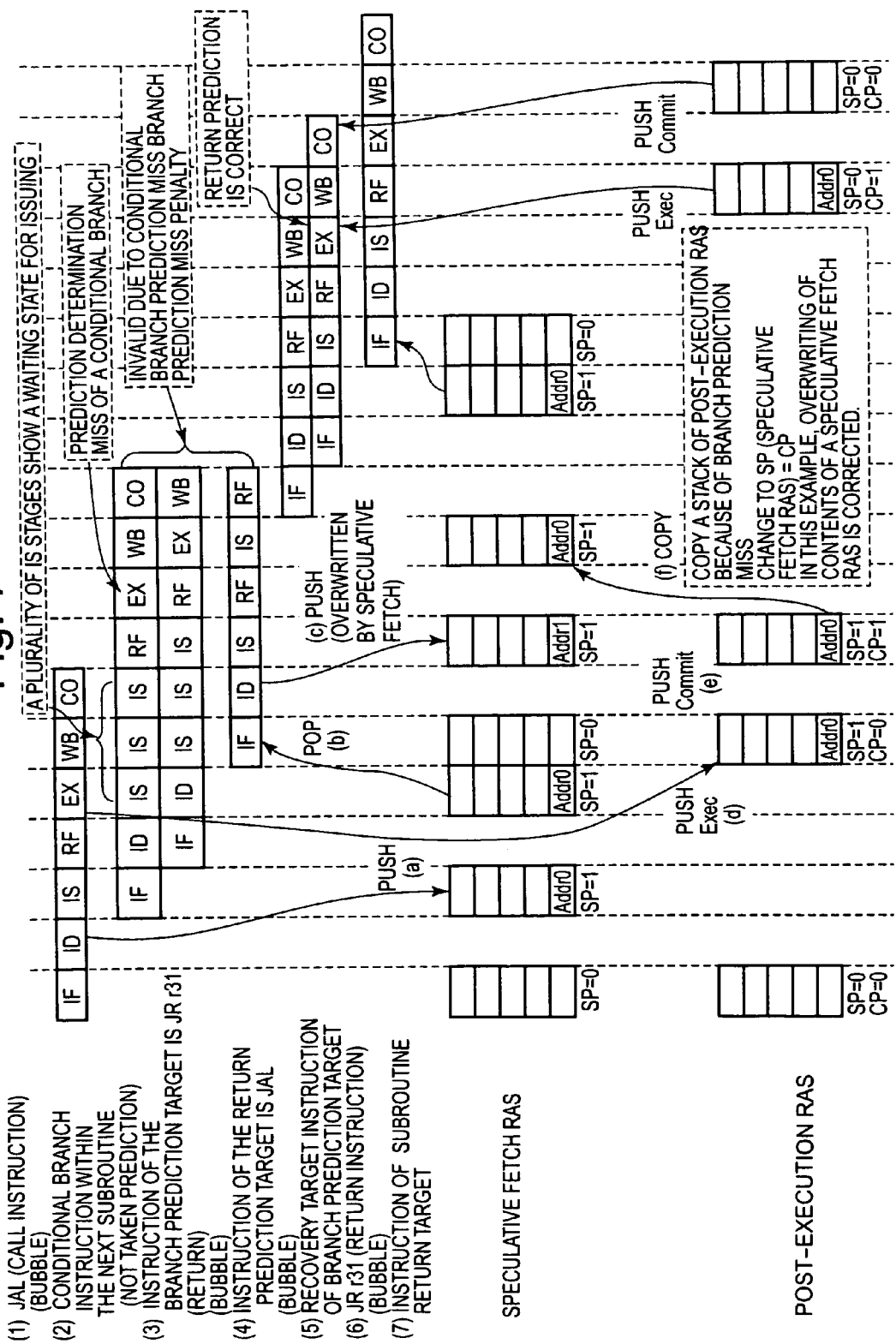
FIG. 7 is a diagram illustrating a pipeline operation of the basic call/return instruction according to the first embodiment.

As shown in FIG. 7, the instruction of the branch prediction target is a "JR r31" instruction, so that the process returns to the prediction return target. Further, an "instruction of a return prediction target is a JAL instruction" of (4), so that the call instruction is fetched in the IF stage. At this time, a pop process (b) is performed on a prediction return address (Addr0) on which a push process (a) is performed to the "speculative fetch RAS" in the ID stage of (1).

Thereafter, in the ID stage of the "JAL" instruction of (4), the prediction return address (Addr1) is processed with a push process (c) to the "speculative fetch RAS," and overwritten. Incidentally, in the "post-execution RAS," the essential return address calculated in the EX stage of (1) is processed with a push process (d).

Thereafter, in the EX stage of (2), a miss is found in the prediction determination of the conditional branch. Accordingly, the instructions of (3) and (4) speculatively executed until the time (2) proceeds to the CO stage are invalidated.

Here, in the first embodiment, the essential return address (Addr0) stored in the "post-execution RAS" is processed to be copied (f) to the "speculative fetch RAS." Therefore, the prediction return address of the "speculative fetch RAS" is changed from Addr1 to Addr0. Then, subsequent processes of the recovery of (5) are the same as those subsequent processes of (9) of FIG. 6. Thus, a further description is omitted.

As in FIG. 6, also in FIG. 7, a penalty is included in the processing time due to the branch prediction miss. However, the contents of the "post-execution RAS" are copied to the "speculative fetch RAS" so that it becomes possible to makes it possible to recover not from the initial state but in the middle of the process. FIG. 7 shows that before a miss in the conditional branch is found, the prediction return address of the next instruction is overwritten on the "speculative fetch RAS." However, even in that case, providing the "post-execution RAS" makes it possible to restore a correct return address.

As described above, in accordance with the first embodiment, the branch prediction of the return instruction can be made with high accuracy by a RAS only without using the branch history. In other words, even when the call instruction and v return instruction are close in time, the prediction return address is stored in a speculative fetch RAS, so that the branch prediction of the return instruction can be executed with high accuracy. Incidentally, when the call/return instruction is predicted, the branch history is not used. Accordingly, there is no need to use a costly resource or to have a learning period for the branch history.

Further, heretofore, when a re-instruction fetch has occurred due to a branch prediction miss, the reason why the contents of the RAS are disturbed is that a stack pointer is forcibly returned to an initial value even when there is a return address derived from the completed call instruction. However, in the first embodiment, the contents of the post-execution RAS are copied to the speculative fetch RAS, whereby the disturbed speculative fetch RAS is corrected so that the branch prediction of the return instruction can be executed with high accuracy.

Embodiment 2 of the Invention

Figure 8:
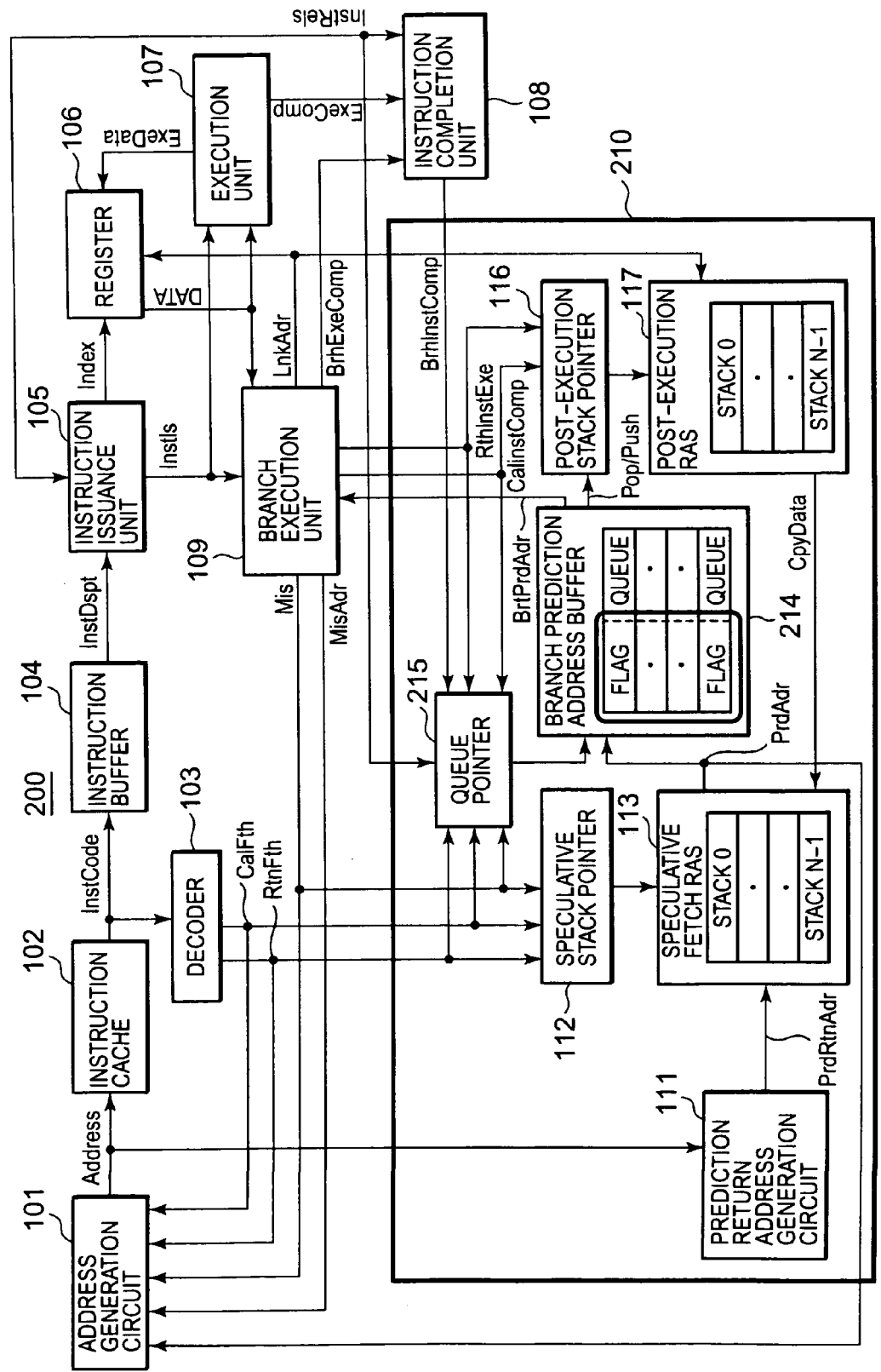
FIG. 8 is a block diagram of an information processing unit having a branch prediction control mechanism according to a second exemplary embodiment.

Next, a second exemplary embodiment of the present invention will be described. Also in this embodiment, an example of a branch prediction control mechanism formed in an information processing unit such as a microprocessor is shown as in the embodiment 1. Descriptions of the same constituent elements, operations, and the like of the branch prediction control mechanism as those of the embodiment 1 are omitted. FIG. 8 is a block diagram illustrating a configuration of an information processing unit including a branch prediction control mechanism of a second embodiment. Referring to the drawings, the branch prediction control mechanism and a method thereof will be described.

A branch prediction control device 210 shown in FIG. 8 includes a prediction return address generation circuit 111, a speculative stack pointer 112, a speculative fetch RAS 113, a branch prediction address buffer 214, a queue pointer 215, a post-execution stack pointer 116, and a post-execution RAS 117.

The branch prediction control device 210 of the second embodiment is also built in a CPU of the information processing unit such as a microprocessor, as in the first embodiment, and is controlled by the CPU. Further, taking-in of data and instructions, stored in a storage unit, through an interface such as a bus is also the same as that of the first embodiment.

An aspect of the branch prediction control device 210 of the second embodiment is that an identifier is provided to a queue of the branch prediction address buffer 214. Namely, provided is a flag identifies whether a prediction return address stored in a queue of the branch prediction address buffer 214 has been executed by an instruction. Functions and operations of the other constituent elements are the same as those of the first embodiment, so that descriptions thereof are omitted.

With increasing complexity of the processing contents of a processor, execution hazard, a software error, or the like occurs in an execution unit 107 while instructions are processed. Consequently, recently, the requesting frequency for reissuing an instruction has increased. In that case, a problem occurs that the processed branch prediction once performed is performed again so that process efficiency deteriorates. For example, it is possible to consider a method in which a return address has been already executed by an instruction is identified using the post-execution RAS 117 of the first embodiment and the execution of the subsequent instruction is restarted. However, in the case where a reissuance of an instruction is requested before the completion of the instruction, the contents are disturbed because the same return address is stored in the post-execution RAS 117. In the second embodiment, a flag provided to the branch prediction address buffer 214 makes possible to identify the instruction which has been already executed without disturbing the contents of the post-execution RAS 117.

The branch prediction address buffer 214 in accordance with the second embodiment has a queue (queue) structure in which first inputted data are first outputted. The controlling of input/output of data by the queue pointer 215 is the same as that of the branch prediction address buffer 114. Further, the following is the same as the first embodiment: a stored prediction return address is read during at the time of the return instruction execution and compared with the return address which is actually executed in order to judge whether the branch prediction is correct. This is also same as the embodiment 1.

However, when the instruction reissuance is made, the operation of the pointer differs from that of the first embodiment. The queue pointer 215 according to the second embodiment will be described in detail. First, the queue pointer 215 includes a write pointer WrP, a read pointer RdP, and a completion pointer Cm. For each pointer, its initial value is "0," its maximum value is given by the "number of queues−1," and when the value exceeds the maximum value, the value is retuned to "0." The read pointer RdP is set to "+1" at the time of fetching of the call instruction and the return instruction. Further, when a branch prediction miss occurs, the value of the read pointer RdP is added by "1." The read pointer RdP is set to "+1" at the time of executions of the call instruction and the return instruction. Further, the value becomes the same as that of the completion pointer Cm at the time of the instruction reissuance. The completion pointer Cm is set to "+1" at the time of the completion of the branch instruction.

In the second embodiment, a flag is added to each queue of the branch prediction address buffer 214 in which a prediction return address is stored. The flag clears a flag of the address which is indicated by the read pointer RdP when the call instruction is fetched. In addition, the flag clears a flag of the address which is indicated by the write pointer WrP when the return instruction is fetched. Further, this flag is set at the time of execution of the call/return instruction. By this setting, it is determined whether the call instruction has been executed once at the time of request for the instruction reissuance. In addition, the branch prediction address buffer 214 outputs, as a branch prediction address, data stored in the queue of the address indicated by the read pointer RdP. At this time, when the flag has been set, the push/pop enable signal (Push/Pop in the drawing) is invalidated.

The outputting of this push/pop enable signal causes pop/push process of the post-execution RAS to be controlled. When the push/pop enable signal is not outputted, even when the call/return instruction is executed, the return address is not processed with the pop/push process to the post-execution RAS. In the second embodiment, when the instruction reissuance is requested and the flag has been set in the queue of the branch prediction address buffer 214, the enable signal of the pop/push process is invalidated so that the stack pointer of the post-execution RAS 117 is not updated. Therefore, the configuration in which the instruction to be executed is identified not by the post-execution RAS 117 but with flag in the branch prediction address buffer 214 when the instruction reissuance is requested is made. In this manner, the branch prediction address buffer 214 prevents a return address provided with the flag which indicates the completion of an execution from being stored in the post-execution RAS 117.

In addition, the queue pointer 215 performs a process of returning to the pointer at which the call/return instruction is complete at the time of the instruction reissuance is requested. That is, the queue pointer 215 manages the completion of the call/return instructions. Further, the queue pointer 215 also manages notification of the completion (BrhInstComp in the drawing) of a branch instruction of the call/return instruction from the instruction completion unit 108. That is, the queue pointer 215 manages whether the return addresses stored in the branch prediction address buffer 214 has been executed.

Next, referring to FIG. 8, a process operation of the branch prediction control device according to the first embodiment will be specifically described in detail. First, an address generation circuit 101 generates an address in which an instruction code is stored, and outputs the address to an instruction cache 102. When the instruction code is decoded and the decoded code is a call instruction, a decoder 103 outputs the fetching of the call instruction to the address generation circuit 101. At the time when the call instruction is fetched, the address generation circuit 101 generates a return address speculatively predicted.

In the instruction cache 102, an instruction code is selected according to the address inputted from the address generation circuit 101, and outputted to the instruction buffer 104. Thereafter, a branch instruction corresponding to the selected instruction code is executed.

Meanwhile, the instruction code outputted from the instruction cache 102 is decoded by the decoder 103 so as to start a branch prediction. When the result of the decoding comes out that the instruction code is a call instruction fetch, a push process is performed on a stack pointer of the speculative stack pointer 112. The prediction return address generated by the prediction return address generation circuit 111 is stacked on the speculative fetch RAS 113. At the same time, the prediction return address is also stored in the branch prediction address buffer 214, and a flag added to the queue is cleared.

When the result of the decoding comes out that the instruction code is a return instruction fetch, a pop process is performed on a stack pointer of the speculative stack pointer 112. In addition, a prediction return address is read from the speculative fetch RAS 113 indicated by the speculative stack pointer 112. The read prediction return address is transmitted to the address generation circuit 101 to be a subsequent instruction fetch address.

In the second embodiment, when a call/return instruction is fetched, a prediction return address is stored in the branch prediction address buffer 214 and a flag of a stored queue is cleared. In other words, this prediction return address indicates that it has not been executed. An address to be stored in the branch prediction address buffer 214 at the time of fetching of a call instruction may be an arbitrary value, because the address is not used at the time of the execution of the call instruction. The flag of the queue is only referred in the branch prediction address buffer 214 at the time of the execution of the call instruction.

Next, when an instruction code passing from the instruction cache 102 to the instruction buffer 104 is a call instruction, instructions are issued from the instruction issuance unit 105 to the execution unit 107 and a branch execution unit 109. Further, a link address calculated in the branch execution unit 109 is transmitted to the post-execution RAS 117, and stored in a stack indicated by a value of the post-execution stack pointer 116. This link address is transmitted to the register 106 and stored therein. In addition, for the post-execution stack pointer 116, when the flag in the branch prediction address buffer 214 is being cleared, an enable signal of a pop/push process comes to a valid state, and thus, a push process is performed on a stack pointer of the post-execution stack pointer 116. Meanwhile, when an enable signal of the pop/push process is in an invalid state, a push process is not performed. After the execution of the instruction, a flag added to a queue storing a return address corresponding to the call instruction of the branch prediction address buffer 214 is set. Thereafter, the branch execution unit 109 and the execution unit 107 notify the instruction completion unit 108 of the completion of the instruction. Further, the instruction completion unit 108 notifies the queue pointer 215 of the completion of the call instruction. Thus, the queue pointer 215 is processed with a push process.

Further, when an instruction code passing from the instruction cache 102 to the instruction buffer 104 is a return instruction, the branch execution unit 109 determines whether the correct return address and the prediction return address agree with each other. That is, the return address stored in the register 106 is compared with the prediction return address to be sent from the branch prediction address buffer 214.

If the correct return address and the prediction return address agree with each other, the branch prediction is correct. Further, when flags of the branch prediction address buffer 214 are being cleared, a pop process is performed on the post-execution stack pointer 116 of the post-execution RAS 117 along with an enable signal of a pop/push process.

If the correct return address and the prediction return address do not agree with each other, then the branch prediction has failed. Further, the branch execution unit 109 transmits a correct return address to the address generation circuit 101. In addition, when the flag in the branch prediction address buffer 214 is confirmed as being cleared, a pop process is performed on the stack pointer of the post-execution RAS 117. Thereafter, re-fetching of the instruction is performed using this address. After the instruction is executed, the branch execution unit 109 notifies the instruction completion unit 108 of completion of the instruction. Here, the flag added to the queue stored in the predicted return address of the branch prediction address buffer 214 is set after the execution of the return instruction. Meanwhile, the queue pointer 215 of the branch prediction address buffer 214 is increased by 1 regardless the branch prediction result. In addition, when there is no execution hazard or a software error, the instruction completion unit 108 notifies the queue pointer 215 that the execution of a return instruction has been completed.

Further, a further description will be given to the case where there is a branch prediction miss. When there is a branch prediction miss, notification thereof is sent to each unit and a process is performed accordingly. To be more specific, a start position of a stack pointer of the speculative stack pointer 112 is newly set. In other words, when there is a branch prediction miss, the speculative fetch RAS 113 copies all the return addresses of the post-execution RAS 117. Moreover, the stack pointer of the speculative stack pointer 112 is caused to be in consistency with the post-execution stack pointer 116. This process enables the correction of the disturbance of the speculative fetch RAS 113 occurred due to the branch prediction miss. The queue pointer 215 of the branch prediction address buffer 214 returns the start position to the initial value. For the instruction issuance unit 105, an issuance is restarted from a correct branch target instruction to rewind the pointer in the instruction buffer 104. In the address generation circuit 101, an instruction fetch from the correct branch target is restarted in accordance with the correct return address transmitted from the branch execution unit 109.

For example, when execution hazard or a software error has occurred in the execution unit 107, the instruction completion unit 108 is informed of error information. If it can be restored, the instruction completion unit 108 requests the instruction issuance unit 105 an instruction reissuance. When the instruction reissuance request is informed, the queue pointer 215 of the branch prediction address buffer 214 is returned to the pointer at which the call/return instruction has been completed. Further, when the call/return instruction is re-executed in the branch execution unit 109, the enable signal of the pop/push process is invalidated, and the post-execution stack pointer 116 is not updated because the flag in the branch prediction address buffer 214 has been set.

As described above, in the second embodiment, at the time when the call/return instruction is executed, the flag in the branch prediction address buffer 214 is set. Accordingly, the flag has been set by the execution of the instruction, and thus, an enable signal to the post-execution RAS 117 is in an invalid state. In other words, a configuration is made such that writing on the return address of the post-execution RAS 117 is prevented from the beginning to the completion of the instruction is made.

Figure 9:
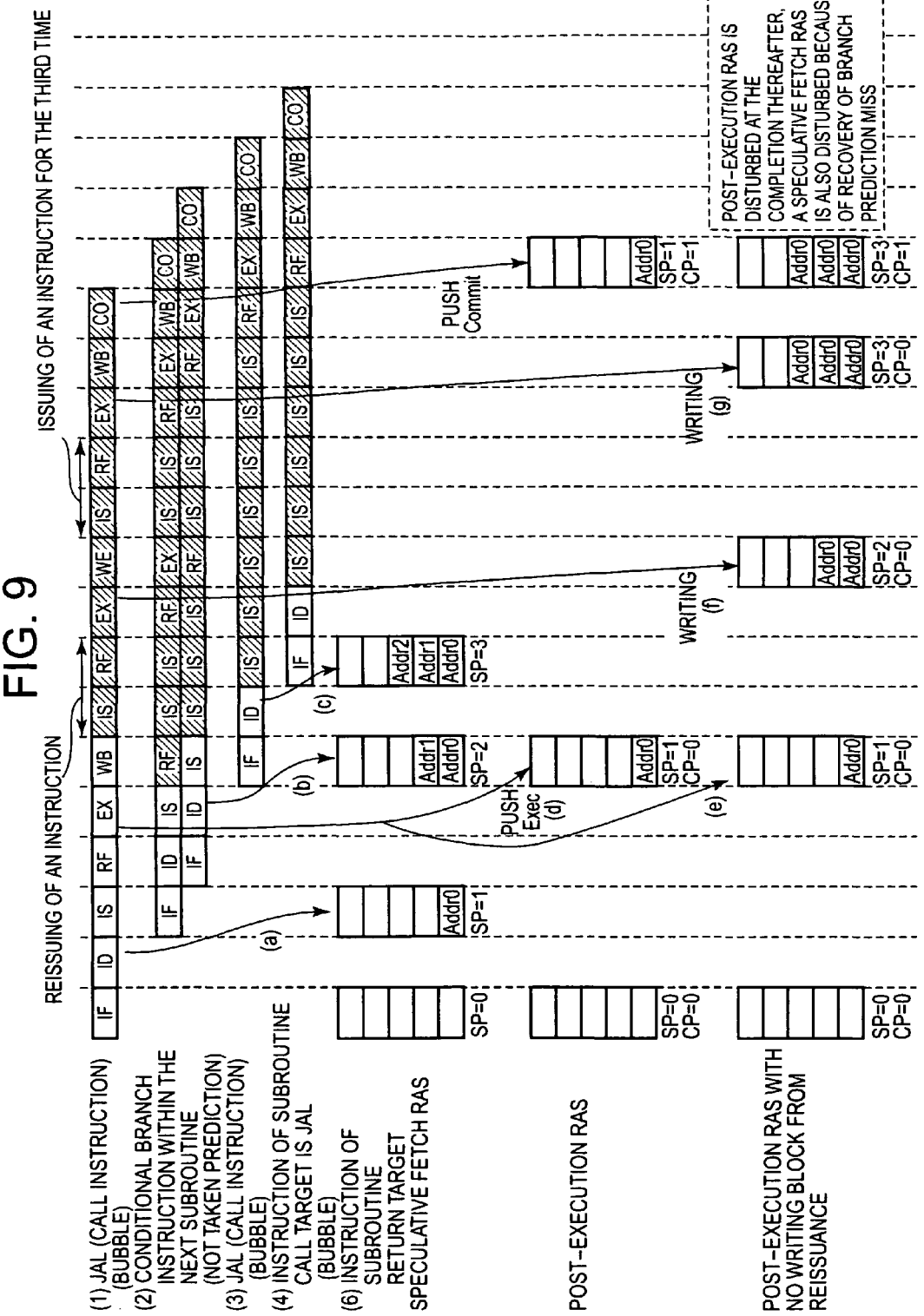
FIG. 9 is a diagram illustrating a pipeline operation of a basic call/return instruction according to the second embodiment.
Figure 10:
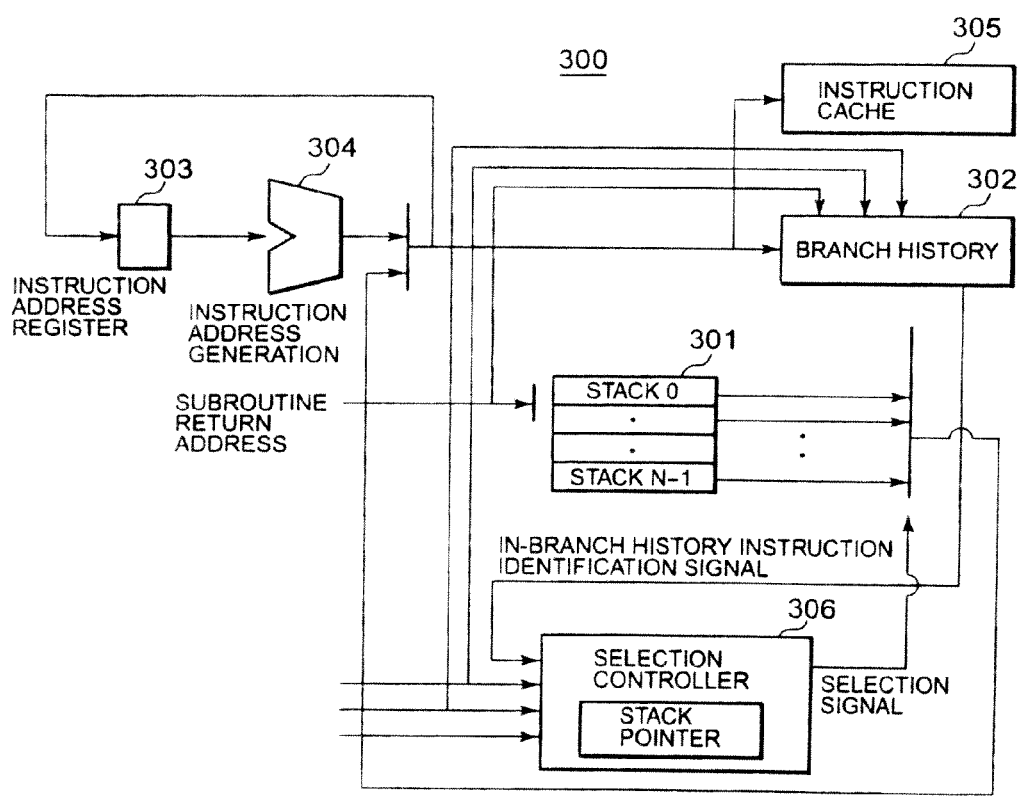
FIG. 10 is a block diagram of a branch prediction control mechanism according to Patent Document 1.

Next, referring to FIG. 9, states of the speculative fetch RAS and the post-execution RAS of the second embodiment will be described in detail. For simplicity of the description, FIG. 8 is used together. FIG. 9 is a diagram illustrating a pipeline operation of a basic call/return instruction in the case where an instruction reissuance has been requested.

On the upper part of FIG. 9, the flow of a call/return instruction is illustrated. On the lower part thereof, a "speculative fetch RAS," a "post-execution RAS," and a "post-execution RAS which with no writing block from a reissuance" are exemplarily illustrated. A storing state, which changes according to a proceeding state of an instruction described above, is also illustrated. Incidentally, processes of the second embodiments are performed on the "speculative fetch RAS" and the "post-execution RAS." For the "post-execution RAS with no writing block from a reissuance," the RAS in the case where processes of the second embodiment are not used is illustrated to clarify the description.

First, a "JAL" (call instruction) of (1) is started. In the case of a pipeline operation, instructions in (2) and those subsequent thereto are speculatively executed one after another before the completion (CO stage) of the "JAL" instruction of (1). FIG. 9 shows the case where prior to the completion (CO stage) of the "JAL" instruction of (1), execution hazard, a software error, or the like occurs and an instruction reissuance is requested. Further, prior to the completion of the instruction of the instruction reissuance of (1), an instruction reissuance is newly requested.

Here, a prediction return address corresponding to the "JAL" of (1) is, in the ID stage of (1), processed with a push process (a) to the "speculative fetch RAS". The prediction return addresses corresponding to "JAL" instructions of (3) and (4) are also, in the respective ID stages (b, c), stored in the "speculative fetch RAS."

In the "post-execution RAS," after the JAL instruction is executed in the EX stage of (1), an essential return address is processed with a push process (d). At this time, the flag of a queue storing the return address of the branch prediction address buffer 214 shown in FIG. 8 is set, and the queue pointer 215 is increased by 1. Accordingly, as shown in FIG. 9, when the instruction reissuance is requested in (1) and the EX stage is newly executed, a pop/push process enable signal to the post-execution RAS is in an invalid state until the instruction is complete (h).

Meanwhile, in the case of the "post-execution RAS with no writing block from a reissuance," after the "JAL" instruction is executed in the EX stage of (1), an essential return address is processed with a push process (e), as in the "post-execution RAS." However, when the "post-execution RAS with no writing block from a reissuance" is used, the writing block (pop/push process enable signal) from the branch prediction address buffer 214 is not generated. Therefore, when the instruction reissuance is requested in (1), the return address is processed with a push process (f) in the EX stage. That is, the same return address as the return address processed with a push process in (e) is newly processed with another push process.

Further, when the instruction reissuance is newly requested in (1) and the EX stage is executed for the third time, the return address is processed with a push process (g) to the "post-execution RAS with no writing block from a reissuance." In other words, the same return address as the return addresses processed with the push processes in (e) and (f) are processed with another push process for the third time. As a result, the post-execution RAS becomes a disturbed one at the completion of the processing. For example, when there is a branch prediction miss in the pipeline operation and the contents of the disturbed post-execution RAS ("post-execution RAS with no writing block from a reissuance") are copied onto the "speculative fetch RAS," the contents of the "speculative fetch RAS" are also disturbed.

As described above, in the second embodiment, a flag indicative of once-executed is added to each entry of the branch prediction address buffer 214. Therefore, a once-executed call/return instruction is prevented from being processed with another pop/push process of the post-execution RAS 117, even when an instruction reissuance is requested because of execution hazard or a software error. Thus, the post-execution RAS is not disturbed by re-execution at the time of the instruction reissuance request. Consequently, a branch prediction of a return instruction with high accuracy is possible by using only the RAS.

Note that, the present invention is not limited to the above-described embodiments. It is possible for the skilled person to make changes, additions, and rearrangement to parts of the above-described embodiments within the scope of the present invention.

Further, it is noted that, Applicant's intent is to encompass equivalents of all claim elements, even if amended later during prosecution.

What is claimed is:

1. A branch prediction control device, comprising:
a prediction return address generation unit which generates a prediction return address according to a call instruction;
a first return address storage unit which stores the prediction return address;
a second return address storage unit which stores a return address to be generated in response to an execution result of the call instruction; and
a branch prediction address storage unit which sends the prediction return address stored in the first return address storage unit, as a branch prediction address, and stores the sent branch prediction address,
wherein, when the branch prediction address differs from a return address which is generated after the execution of a branch instruction or a return instruction, a content stored in the second return address storage unit is copied to the first return address storage unit, and
wherein the branch prediction address storage unit includes a flag, serving as an identifier indicating whether a return instruction which corresponds to a branch prediction address to be sent has been executed.

2. The branch prediction control device according to claim 1, wherein, when the branch prediction address differs from a return address which is generated after the execution of a branch instruction or a return instruction, a subsequent branch prediction is performed using the return address copied from the second return address storage unit.

3. The branch prediction control device according to claim 1, further comprising:
a first stack pointer which manages a designation and reads a prediction return address to be stored in the first return address storage unit;
a second stack pointer which manages the designation and reads a return address to be stored in the second return address storage unit; and
a queue pointer which manages the designation and reads a prediction return address to be stored in the prediction address storage unit.

4. The branch prediction control device according to claim 3, wherein, when a call instruction is fetched and a prediction return address is stored in the first return address storage unit, the first stack pointer designates, as a valid entry, an entry in which the prediction return address is stored; and
when a return instruction is fetched, the first stack pointer manages the reading of a prediction return address stored in the designated entry.

5. The branch prediction control device according to claim 3, wherein, when a call instruction is executed and a return address is stored in the second return address storage unit, the second stack pointer designates, as a valid entry, an entry in which the return address is stored; and
when a return instruction is executed, the second stack pointer manages the reading of a return address stored in the designated entry.

6. The branch prediction control device according to claim 3, wherein, when a call instruction is executed and a return address is stored in the branch prediction storage unit, the queue pointer designates, as a valid entry, an entry in which the prediction return address is stored; and
when a return instruction is executed, the queue pointer sends, as a prediction address, a prediction return address stored in the designated entry.

7. The branch prediction control device according to claim 3, wherein the queue pointer manages the execution and completion of call and return instructions.

8. The branch prediction control device according to claim 1, wherein the branch prediction address storage unit sets the flag at a time of execution of the return instruction, and clears the flag when the branch prediction address storage unit stores the prediction return address stored in the first return address storage unit.

9. An information processing unit which performs a pipeline process on a speculatively generated instruction comprising the branch prediction control device according to claim 1, wherein the branch prediction control device generates a prediction return address used for a generation of a speculative instruction, and generates a branch prediction address used for verification of a consistency of an instruction being speculatively executed.

10. A branch prediction method of performing a branch prediction in an information processing unit which performs a pipeline process, the branch prediction method comprising:
storing a first return address which corresponds to a call instruction, and which is speculatively predicted, at a time of fetching the call instruction;
storing a second return address corresponding to the call instruction at a time of executing the call instruction;
determining whether the first and second return addresses agree with each other;
performing a subsequent branch prediction by using the first return address when the first and second return addresses agree with each other;
copying the second return address to a storage unit of the first return address, and performing a subsequent branch prediction using the copied return address when the first and second return addresses do not agree with each other;
identifying that a return instruction which corresponds to the first return address has been executed, using a flag associated with instructions stored in a branch prediction address buffer; and
restarting an instruction, as based on the identified return address stored in the branch prediction address buffer and its associated flag, when an instruction reissuance is requested.

11. The branch prediction method according to claim 10, further comprising:
controlling whether to rewrite the second return address, according to the identifier which indicates that a return instruction corresponding to a branch prediction address has been executed.

12. The branch prediction control device according to claim 10, wherein restarting the instruction without storing a third return address corresponding to the restarted instruction at a time of executing the restarted instruction, as based on the identified return address stored in the branch prediction address buffer and its associated flag.

* * * * *